(12) United States Patent
Lee et al.

(10) Patent No.: US 10,948,405 B2
(45) Date of Patent: Mar. 16, 2021

(54) GAS SENSOR

(71) Applicant: LG ELECTRONICS INC., Seoul (KR)

(72) Inventors: Minwoo Lee, Seoul (KR); Junho Sung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 42 days.

(21) Appl. No.: 16/465,990

(22) PCT Filed: Feb. 22, 2017

(86) PCT No.: PCT/KR2017/001926
§ 371 (c)(1),
(2) Date: May 31, 2019

(87) PCT Pub. No.: WO2018/105815
PCT Pub. Date: Jun. 14, 2018

(65) Prior Publication Data
US 2019/0310186 A1    Oct. 10, 2019

(30) Foreign Application Priority Data

Dec. 6, 2016 (KR) .......................... 10-2016-0164926

(51) Int. Cl.
*G01N 21/3504* (2014.01)
*G02B 3/00* (2006.01)
(Continued)

(52) U.S. Cl.
CPC ......... *G01N 21/3504* (2013.01); *G01N 21/35* (2013.01); *G02B 3/00* (2013.01);
(Continued)

(58) Field of Classification Search
CPC ............... G01N 21/3504; G01N 21/35; G01N 2201/0221; G01N 2201/0636; G02B 3/00; G02B 17/08
See application file for complete search history.

(56) References Cited

U.S. PATENT DOCUMENTS 5,125,742 A  6/1992  Wilks, Jr.
5,428,222 A  6/1995  Alexay
(Continued)

FOREIGN PATENT DOCUMENTS

GB     2395260        5/2004
KR  1020090013434    2/2009
(Continued)

OTHER PUBLICATIONS

European Patent Office Application Serial No. 17877887.4, Search Report dated Jun. 22, 2020, 9 pages.
(Continued)

*Primary Examiner* — Christine S. Kim
(74) *Attorney, Agent, or Firm* — Lee, Hong, Degerman, Kang & Waimey

(57) ABSTRACT

The present invention relates to a gas sensor employing a non-dispersive infrared (NDIR) scheme. The gas sensor may comprise: a light source portion for emitting light; a light cavity portion for multi-reflecting the emitted light; a light detecting portion for detecting the multi-reflected light; a first light coupling portion for reflecting and concentrating the light emitted by the light source portion toward the light cavity portion; and a second light coupling portion for reflecting and concentrating the light reflected by the light cavity portion toward the light detecting portion. The first light coupling portion may comprise a light emitting surface that faces a side surface of the light cavity portion and has a via hole through which light passes, and a reflecting surface extending from the light emitting surface so as to (Continued)

surround the upper portion and the side portion of the light source portion such that light emitted by the light source portion is reflected toward the via hole of the light emitting surface. The second light coupling portion may comprise a light incident surface that faces a side surface of the light cavity portion and has a via hole through which light incident from the light cavity portion passes, and a reflecting surface extending from the light incident surface so as to surround the upper portion and the side portion of the light detecting portion such that light incident from the light cavity portion is reflected toward the light detecting portion.

18 Claims, 17 Drawing Sheets

(51) Int. Cl.
  *G02B 17/08* (2006.01)
  *G01N 21/35* (2014.01)
(52) U.S. Cl.
  CPC ..... *G02B 17/08* (2013.01); *G01N 2201/0221* (2013.01); *G01N 2201/0636* (2013.01)

(56) References Cited

U.S. PATENT DOCUMENTS

| | | | |
|---|---|---|---|
| 2002/0185603 A1* | 12/2002 | Daly | G01N 21/031 250/339.07 |
| 2010/0079760 A1* | 4/2010 | Bernacki | G02B 17/004 356/437 |
| 2014/0070101 A1 | 3/2014 | Matsushima et al. | |
| 2018/0011003 A1* | 1/2018 | Baum | G01N 21/31 |

FOREIGN PATENT DOCUMENTS

| | | | |
|---|---|---|---|
| KR | 20090086766 A | * | 8/2009 |
| KR | 1020090086766 | | 8/2009 |
| KR | 20100135060 A | * | 12/2010 |
| KR | 1020100135060 | | 12/2010 |
| KR | 1020160032863 | | 3/2016 |
| WO | 2010101430 | | 9/2010 |

OTHER PUBLICATIONS

PCT International Application No. PCT/KR2017/001926, Written Opinion of the International Searching Authority dated Aug. 21, 2017, 32 pages.

* cited by examiner

GAS SENSOR

CROSS-REFERENCE TO RELATED APPLICATIONS

This application is the National Stage filing under 35 U.S.C. 371 of International Application No. PCT/KR2017/001926, filed on Feb. 22, 2017, which claims the benefit of earlier filing date and right of priority to Korean Application No. 10-2016-0164926, filed on Dec. 6, 2016, the contents of which are all hereby incorporated by reference herein in their entirety.

TECHNICAL FIELD

The present invention relates to a gas sensor using an NDIR (Non-Dispersive Infra-Red) system.

BACKGROUND ART

Generally, a gas sensor using an NDIR (Non-Dispersive Infra-Red) system is configured to reversely count a gaseous concentration by measuring an absorption rate of a target gas on a light path in accordance with a unique absorption wavelength of NDIR and a Beer-Lambert law based on the unique absorption wavelength.

Since the Beer-Lambert law is calculated using a light path and an absorption rate according to the light path, the gas sensor of the NDIR system is capable of performing accurate sensing as it has a long light path at a possible level.

However, the gas sensor of the NDIR system needs a large light cavity to make sure of a long light path. Since a surface of the light cavity is treated with Au to make sure of high reflectivity of infrared rays and prevent corrosion caused by the outdoor air from occurring, a high manufacturing cost is required.

Also, since a gas sensor of the existing NDIR system is mainly manufactured using a filament light source, power consumption is increased. Also, since the gas sensor of the existing NDIR system should have various optical reflective structures to make sure of an appropriate light path from a radial light source, its structure is complicated and a level of difficulty in manufacture and the manufacturing cost are increased. Also, the gas sensor has no option but to have a size of several cm.

Recently, although sizes of a light source and a light receiving portion of the gas sensor could remarkably be reduced using the MEMS (Micro-Electro-Mechanical System) technology, a size of a light cavity is not reduced, whereby there is a limitation in reducing an overall size of the gas sensor.

Therefore, development of a gas sensor capable of performing accurate sensing by making sure of a long light path while enabling miniaturization in an overall size will be needed in the future.

DISCLOSURE

Technical Problem

An object of the present invention is to solve the aforementioned problems and other problems. Another object of the present invention is to provide a gas sensor capable of making sure of a long light path while miniaturizing an overall size by using a first light coupling portion for reflecting and condensing light emitted from a light source portion toward a light cavity portion and a second light coupling portion for reflecting and condensing the light reflected from the light cavity portion.

Still another object of the present invention is to provide a gas sensor capable of enhancing gas sensing efficiency by making sure of a long light path as a light focus reaches an optimal position by adjusting a curvature radius of a reflective surface of first and second light coupling portions.

Further still another object of the present invention is to provide a gas sensor capable of enhancing gas sensing efficiency by blocking light leakage to the outside by arranging a light shielding film near a contact surface between first and second light coupling portions and a light cavity portion.

Further still another object of the present invention is to provide a gas sensor capable of enhancing gas sensing efficiency by enhancing light reflectivity by coating inner surfaces of first and second light coupling portions and a light cavity portion with an infrared reflective material.

Further still another object of the present invention is to provide a gas sensor capable of enhancing gas sensing efficiency by removing noise of incident light by arranging a light filter on a light incident surface of a second light coupling portion.

Further still another object of the present invention is to provide a gas sensor capable of enhancing gas sensing efficiency by arranging a plurality of via holes and a plurality of detectors in a second light coupling portion.

Further still another object of the present invention is to provide a gas sensor capable of enhancing gas sensing efficiency by arranging a light wavelength filter in a plurality of via holes formed in a second light coupling portion.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

A gas sensor according to one embodiment of the present invention comprises a light source portion for emitting light, a light cavity portion for multi-reflecting the emitted light, a light detector for detecting the multi-reflected light, a first light coupling portion for reflecting and condensing the light emitted from the light source portion toward the light cavity portion, and a second light coupling portion for reflecting and condensing the light reflected from the light cavity portion toward the light detector.

In this case, the first light coupling portion includes a light emitting surface facing a side of the light cavity portion and having a via hole through which light passes, and a reflective surface extended to the light emitting surface to surround an upper portion and a side portion of the light source portion, reflecting light emitted from the light source portion toward the via hole of the light emitting surface. The second light coupling portion includes a light incident surface facing a side of the light cavity portion and having a via hole through which light incident from the light cavity portion passes, and a reflecting surface extended to the light incident surface to surround an upper portion and a side portion of the light detector, reflecting light incident from the light cavity portion toward the light detector.

Advantageous Effects of the Invention

Advantageous effects of a gas sensor according to the present invention are as follows.

According to at least one of the embodiments of the present invention, a gas sensor is capable of making sure of a long light path while miniaturizing an overall size by using a first light coupling portion for reflecting and condensing light emitted from a light source portion toward a light cavity portion and a second light coupling portion for reflecting and condensing the light reflected from the light cavity portion.

According to at least one of the embodiments of the present invention, it is possible to enhance gas sensing efficiency by making sure of a long light path as a light focus reaches an optimal position by adjusting a curvature radius of a reflective surface of first and second light coupling portions.

According to at least one of the embodiments of the present invention, it is possible to enhance gas sensing efficiency by blocking light leakage to the outside by arranging a light shielding film near a contact surface between first and second light coupling portions and a light cavity portion.

According to at least one of the embodiments of the present invention, it is possible to enhance gas sensing efficiency by enhancing light reflectivity by coating inner surfaces of first and second light coupling portions and a light cavity portion with an infrared reflective material.

According to at least one of the embodiments of the present invention, it is possible to enhance gas sensing efficiency by removing noise of incident light by arranging a light filter on a light incident surface of a second light coupling portion.

According to at least one of the embodiments of the present invention, it is possible to enhance gas sensing efficiency by arranging a plurality of via holes and a plurality of detectors in a second light coupling portion.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BEST MODE FOR CARRYING OUT THE INVENTION

Reference will now be made in detail to the preferred embodiments of the present specification, examples of which are illustrated in the accompanying drawings. Wherever possible, the same reference numbers will be used throughout the drawings to refer to the same or like parts. The suffixes "module" and "unit" for the elements used in the following description are given or used in common by considering facilitation in writing this disclosure only but fail to have meanings or roles discriminated from each other. Also, in description of the embodiments disclosed in this specification, if detailed description of the disclosure known in respect of the present invention is determined to make the subject matter of the embodiments disclosed in this specification obscure, the detailed description will be omitted. Also, the accompanying drawings are only intended to facilitate understanding of the embodiments disclosed in this specification, and it is to be understood that technical spirits disclosed in this specification are not limited by the accompanying drawings and the accompanying drawings include all modifications, equivalents or replacements included in technical spirits and technical scope of the present invention.

Although the terms such as "first" and/or "second" in this specification may be used to describe various elements, it is to be understood that the elements are not limited by such terms. The terms may be used to identify one element from another element.

The expression that an element is "connected" or "coupled" to another element should be understood that the element may directly be connected or coupled to another element, a third element may be interposed between the corresponding elements, or the corresponding elements may be connected or coupled to each other through a third element. On the other hand, the expression that an element is "directly connected" or "directly coupled" to another element" means that no third element exists therebetween.

It is to be understood that the singular expression used in this specification includes the plural expression unless defined differently on the context.

In this application, it is to be understood that the terms such as "include" and "has" are intended to designate that features, numbers, steps, operations, elements, parts, or their combination, which are disclosed in the specification, exist, and are intended not to previously exclude the presence or optional possibility of one or more other features, numbers, steps, operations, elements, parts, or their combinations.

Figure 1:
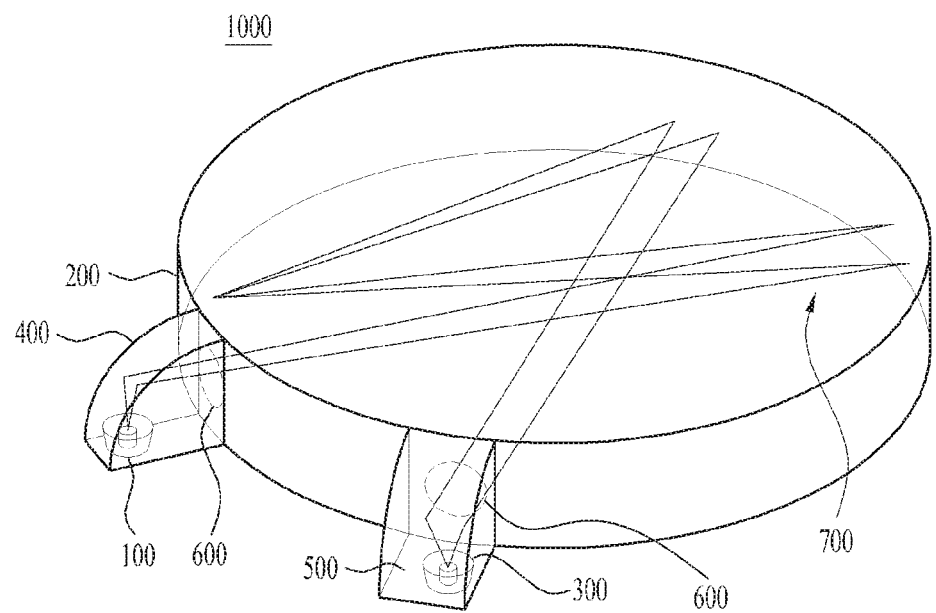
FIG. 1 is a perspective view illustrating a structure of a gas sensor according to the present invention.

FIG. 1 is a perspective view illustrating a structure of a gas sensor according to the present invention.

As shown in FIG. 1, a gas sensor 1000 of the present invention may include a light source portion 100, a light cavity (optical cavity) portion 200, a light detector 300, a first light coupling portion 400, and a second light coupling portion 500.

In this case, the light source portion 100 may emit light in a direction of the light cavity portion 200, for example, may generate light of an infrared ray wavelength range.

Subsequently, the light cavity portion 200 may multi-reflects light emitted from the light source portion 100.

In this case, the light cavity portion 200 may have a cylindrical body portion of which upper and lower surfaces are flat surfaces and side is a curved surface.

The light cavity portion 200 may include a first via hole 600 and a second via hole 600 at the side.

In this case, the first via hole 600 may allow the light emitted from the light source portion 100 to enter the light cavity portion 200.

Also, the second via hole 600 may allow the light multi-reflected inside the light cavity portion 200 to be emitted to the light detector 300.

Subsequently, an infrared ray reflective material may be coated on the inside of the side of the light cavity portion 200.

This is because that it is possible to improve gas sensing efficiency by enhancing reflectivity of light.

The first via hole 600 may be formed to correspond to the first light coupling portion 400, and the second via hole 600 may be formed to correspond to the second light coupling portion 500.

In this case, a diameter of the first via hole 600 serves as an aperture of light, and may be varied depending on a distance between a reflective surface of the first light coupling portion 400 and a focus point of light reflected from the reflective surface.

At this time, the focus point of light may be a point offset as much as a certain distance from a center point of the light cavity portion 200.

For example, the diameter of the first via hole 600 may be reduced as the distance between the reflective surface of the first light coupling portion 400 and the focus point of light reflected from the reflective surface is increased.

Also, an infrared filter may be arranged in the second via hole 600.

This is to enhance gas sensing efficiency by removing noise of light.

Subsequently, the side of the light cavity portion 200 may be a curved surface having a predetermined curvature radius.

In this case, the curvature radius may be varied depending on a side of the light cavity portion 200 and a focus point of light reflected from the side of the light cavity portion 200.

At this time, the focus point of light may be a point offset as much as a certain distance from the center point of the light cavity portion 200.

For example, the curvature radius may be increased as the distance between the side of the light cavity portion 200 and the focus point of light reflected from the side of the light cavity portion 200 is increased.

Then, the light detector 300 may detect the multi-reflected light from the light cavity portion 200, for example, may detect light of an infrared ray wavelength range.

Subsequently, the first light coupling portion 400 may reflect and condense the light emitted from the light source portion 100 toward the light cavity portion 200.

In this case, the first light coupling portion 400 may include a light emitting surface facing the side of the light cavity portion 200 and having a via hole through which light passes, and a reflective surface extended to the light emitting surface to surround an upper portion and a side portion of the light source portion 100, reflecting the light emitted from the light source portion 100 toward the via hole of the light emitting surface.

The via hole of the light emitting surface may be arranged to correspond to a via hole formed at the side of the light cavity portion 200.

In this case, a diameter of the via hole of the light emitting surface serves as an aperture of light, and may be varied depending on a distance between a reflective surface and a focus point of light reflected from the reflective surface.

At this time, the focus point of light may be a point offset as much as a certain distance from the center point of the light cavity portion.

For example, the diameter of the via hole of the light emitting surface may be reduced as the distance between the reflective surface and the focus point of light reflected from the reflective surface is increased.

The light emitting surface of the first light coupling portion 400 may be in contact with the side of the light cavity portion 200.

As the case may be, a light shielding film may be formed near the contact surface between the light emitting surface of the first light coupling portion 400 and the light cavity portion 200.

In this case, the light shielding film may be provided with a reflective layer formed on a surface facing the contact surface between the light emitting surface and the light cavity portion 200.

Subsequently, the reflective surface of the first light coupling portion 400 may be coated with an infrared ray reflective material.

This is to enhance gas sensing efficiency by reflecting light toward the inside.

Next, the light emitting surface of the first light coupling portion 400 may be a curved surface having a first curvature radius, and the reflective surface of the first light coupling portion 400 may be a curved surface having a second curvature radius.

In this case, the first curvature radius of the light emitting surface may be different from the second curvature radius of the reflective surface.

For example, the first curvature radius of the light emitting surface may be greater than the second curvature radius of the reflective surface.

As the case may be, the first curvature radius of the light emitting surface may be equal to the curvature radius of the side of the light cavity portion.

Subsequently, the second curvature radius of the reflective surface of the first light coupling portion 400 is to condense light, and may be varied depending on the distance between the reflective surface and the focus point of light reflected from the reflective surface.

In this case, the focus point of light may be a point offset as much as a certain distance from the center point of the light cavity portion 200.

For example, the second curvature radius of the reflective surface of the first light coupling portion 400 may be increased as the distance between the reflective surface and the focus point of light reflected from the reflective surface is increased.

In another embodiment, the first light coupling portion 400 may include an opening portion facing the side of the light cavity portion 200, and a reflective surface extended from the opening portion to surround an upper portion and a side portion of the light source portion 100, reflecting the light emitted from the light source portion 100 toward the opening portion In this case, the opening portion may be arranged to correspond to the via hole 600 formed at the side of the light cavity portion 200.

For example, an edge area of the opening portion may be in contact with the side of the light cavity portion.

As the case may be, a light shielding film may be formed near a contact surface between the opening portion and the light cavity portion 200.

In this case, the light shielding film may be provided with a reflective layer formed on a surface facing the contact surface between the opening portion and the light cavity portion 200.

The reflective surface of the first light coupling portion 400 may be coated with an infrared ray reflective material.

This is to enhance gas sensing efficiency by reflecting light toward the inside.

Subsequently, the reflective surface of the first light coupling portion 400 may be a curved surface having a first curvature radius.

In this case, the curvature radius of the reflective surface of the first light coupling portion 400 is to condense light, and may be varied depending on the distance between the reflective surface and the focus point of light reflected from the reflective surface.

At this time, the focus point of light may be a point offset as much as a certain distance from the center point of the light cavity portion 200.

For example, the curvature radius of the reflective surface may be increased as the distance between the reflective surface and the focus point of light reflected from the reflective surface is increased.

Meanwhile, the second light coupling portion 500 may reflect and condense the light emitted from the light cavity portion 200 toward the light detector 300.

In this case, the second light coupling portion 500 may include a light incident surface facing the side of the light cavity portion 200 and having a via hole through which the incident light from the light cavity portion 200 passes, and a reflective surface extended to the light incident surface to surround an upper portion and a side portion of the light detector 300, reflecting the incident light from the light cavity portion 200 toward the light detector 300.

The via hole of the light incident surface may be arranged to correspond to a via hole formed at the side of the light cavity portion 200.

As the case may be, an infrared filter may be arranged in the via hole of the light incident surface.

This is to enhance gas sensing efficiency by removing noise of light.

The light incident surface of the second light coupling portion 500 may be in contact with the side of the light cavity portion 200.

For example, a light shielding film may be formed near the contact surface between the light incident surface of the second light coupling portion 500 and the light cavity portion 200.

In this case, the light shielding film may be provided with a reflective layer formed on a surface facing the contact surface between the light incident surface of the second light coupling portion 500 and the light cavity portion 200.

The reflective surface of the second light coupling portion 500 may be coated with an infrared ray reflective material.

This is to enhance gas sensing efficiency by reflecting light toward the inside.

Next, the light incident surface of the second light coupling portion 500 may be a curved surface having a third curvature radius, and the reflective surface of the second light coupling portion 500 may be a curved surface having a fourth curvature radius.

In this case, the third curvature radius of the light incident surface may be different from the fourth curvature radius of the reflective surface.

For example, the third curvature radius of the light incident surface may be greater than the fourth curvature radius of the reflective surface.

As the case may be, the third curvature radius of the light incident surface of the second light coupling portion 500 may be equal to the curvature radius of the side of the light cavity portion.

Also, the fourth curvature radius of the reflective surface may be varied depending on the distance between the reflective surface and a detection area of the light detector 300.

For example, the fourth curvature radius of the reflective surface may be increased as the distance between the reflective surface and the detection area of the light detector 300 is increased.

In another embodiment, the second light coupling portion 500 may include an opening portion facing the side of the light cavity portion 200, through which incident light from the light cavity portion 200 passes, and a reflective surface extended from the opening portion to surround an upper portion and a side portion of the light detector 300, reflecting the incident light from the light cavity portion 200 toward the light detector 300.

In this case, the opening portion may be arranged to correspond to the via hole 600 formed at the side of the light cavity portion 200.

As the case may be, the edge area of the opening portion may be in contact with the side of the light cavity portion.

For example, a light shielding film may be formed near the contact surface between the opening portion and the light cavity portion 200.

In this case, the light shielding film may be provided with a reflective layer formed on a surface facing the contact surface between the opening portion and the light cavity portion 200.

The reflective surface of the second light coupling portion 500 may be coated with an infrared ray reflective material.

This is to enhance gas sensing efficiency by reflecting light toward the inside.

The reflective surface of the second light coupling portion 500 may be a curved surface having a predetermined curvature radius.

In this case, the curvature radius of the reflective surface may be varied depending on the reflective surface and the detection area of the light detector 300.

For example, the curvature radius of the reflective surface may be increased as the distance between the reflective surface and the detection area of the light detector 300 is increased.

In another embodiment, the second light coupling portion 500 may include a light incident surface facing the side of the light cavity portion 200, having a first via hole through which first light entering from the light cavity portion 200 passes and a second via hole through which second light passes, a first reflective surface extended to the light incident surface to surround an upper portion and a side portion of a first light detector, reflecting the first light incident from the light cavity portion toward the first light detector, and a second reflective surface extended to the light incident surface to surround an upper portion and a side portion of a second light detector, reflecting the second light incident from the light cavity portion toward the second light detector.

In this case, the first and second via holes of the light incident surface of the second light coupling portion 500 may be arranged to correspond to the via hole formed at the side of the light cavity portion 200.

As the case may be, a first filter for transmitting only a wavelength range of the first light may be arranged in the first via hole of the light incident surface, and a second filter for transmitting only a wavelength range of the second light may be arranged in the second via hole of the light incident surface.

This is to enhance gas sensing efficiency by removing noise of light.

Next, the light incident surface of the second light coupling portion 500 may be in contact with the side of the light cavity portion 200.

For example, a light shielding film may be formed near the contact surface between the light incident surface of the second light coupling portion 500 and the light cavity portion 200.

For example, the light shielding film may be provided with a reflective layer formed on a surface facing the contact surface between the light incident surface and the light cavity portion 200.

This is to enhance gas sensing efficiency by reflecting light toward the inside.

Also, the first and second reflective surfaces of the second light coupling portion 500 may be coated with an infrared ray reflective material.

This is to enhance gas sensing efficiency by enhancing reflectivity of light.

The light incident surface may be a curved surface having a fifth curvature radius, the first reflective surface may be a curved surface having a sixth curvature radius, and the second reflective surface may be a curved surface having a seventh curvature radius.

In this case, the fifth, sixth and seventh curvature radiuses may be different from one another.

For example, the fifth curvature radius of the light incident surface may be greater than the sixth curvature radius of the first reflective surface and the seventh curvature radius of the second reflective surface.

In this case, the fifth curvature radius of the light incident surface of the second light coupling portion 500 may be equal to the curvature radius of the side of the light cavity portion 200.

Also, the sixth curvature radius of the first reflective surface may be varied depending on the distance between the first reflective surface and a detection area of the first light detector.

For example, the sixth curvature radius of the first reflective surface may be increased as the distance between the first reflective surface and the detection area of the first light detector is increased.

Subsequently, the seventh curvature radius of the second reflective surface may be varied depending on the distance between the second reflective surface and a detection area of the second light detector.

For example, the seventh curvature radius of the second reflective surface may be increased as the distance between the second reflective surface and the detection area of the second light detector is increased.

As described above, according to the present invention, it is possible to make sure of a long light path while miniaturizing an overall size of the gas sensor by using the first light coupling portion for reflecting and condensing light emitted from the light source portion toward the light cavity portion and the second light coupling portion for reflecting and condensing the light reflected from the light cavity portion toward the light detector.

Also, according to the present invention, it is possible to enhance gas sensing efficiency by making sure of a long light path as the focus of light reaches an optimal position by adjusting the curvature radius of each reflective surface of the first and second light coupling portions.

Also, according to the present invention, it is possible to enhance gas sensing efficiency by blocking light leakage to the outside by arranging the light shielding film near the contact surface between the first and second light coupling portions and the light cavity portion.

Also, according to the present invention, it is possible to enhance gas sensing efficiency by enhancing light reflectivity by coating inner surfaces of the first and second light coupling portions and the light cavity portion with an infrared reflective material.

Also, according to the present invention, it is possible to enhance gas sensing efficiency by removing noise of incident light by arranging the light filter on the light incident surface of the second light coupling portion.

Also, according to the present invention, it is possible to enhance gas sensing efficiency by arranging the plurality of via holes and the plurality of detectors in the second light coupling portion.

Figure 2:
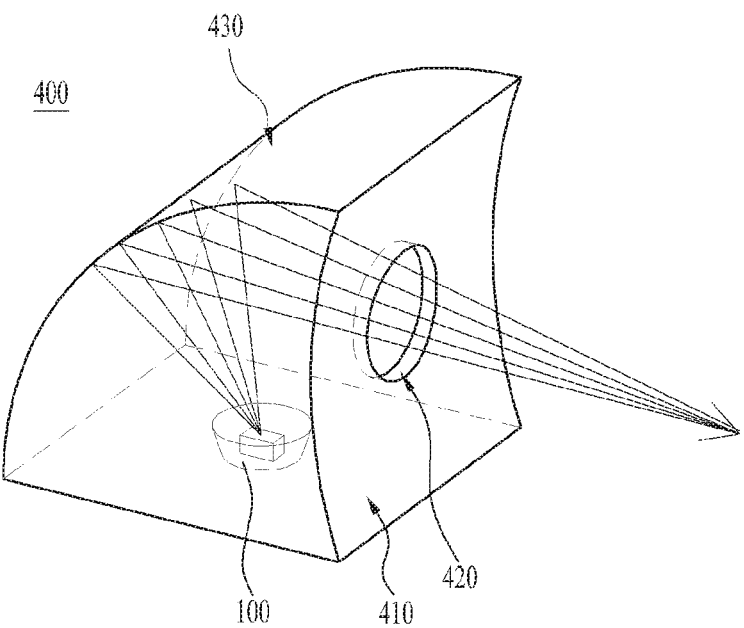
FIG. 2 is a view illustrating a first light coupling portion according to the first embodiment of the present invention.

FIG. 2 is a view illustrating a first light coupling portion according to the first embodiment of the present invention.

As shown in FIG. 2, the first light coupling portion 400 may reflect and condense the light emitted from the light source portion 100 toward the light cavity portion.

In this case, the first light coupling portion 400 may include a light emitting surface 410 having a via hole 420 through which light passes, and a reflective surface 430 extended to the light emitting surface to surround an upper portion and a side portion of the light source portion 100, reflecting the light emitted from the light source portion 100 toward the via hole 420 of the light emitting surface 410.

A diameter of the via hole 420 of the light emitting surface 410 serves as an aperture of light, and may be varied depending on a distance between a reflective surface 430 and a focus point of light reflected from the reflective surface 430.

At this time, the focus point of light may be a point offset as much as a certain distance from the center point of the light cavity portion.

Subsequently, the light emitting surface 410 may be a curved surface having a first curvature radius, and the reflective surface 430 may be a curved surface having a second curvature radius.

In this case, the first curvature radius of the light emitting surface 410 may be different from the second curvature radius of the reflective surface 430.

For example, the first curvature radius of the light emitting surface 410 may be greater than the second curvature radius of the reflective surface 430.

Next, the second curvature radius of the reflective surface 430 is to condense light, and may be varied depending on the distance between the reflective surface 430 and a focus point of light reflected from the reflective surface 430.

In this case, the focus point of light may be a point offset as much as a certain distance from the center point of the light cavity portion.

Figure 3:
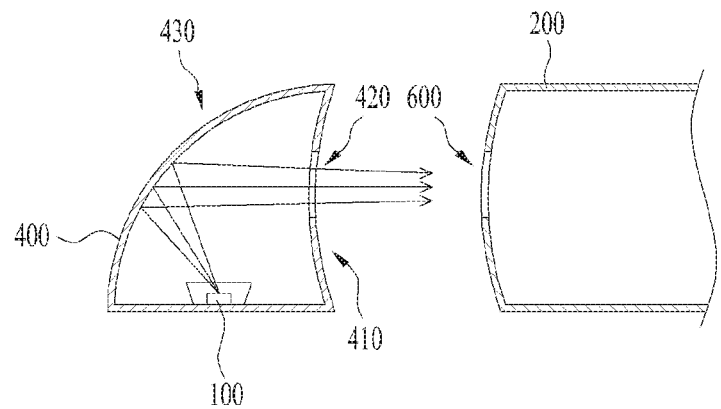
FIG. 3 is a view illustrating a position of a via hole of a first light coupling portion according to the first embodiment of the present invention.

FIG. 3 is a view illustrating a position of a via hole of a first light coupling portion according to the first embodiment of the present invention.

As shown in FIG. 3, the first light coupling portion 400 may include a light emitting surface 410 and a reflective surface 430.

In this case, the light emitting surface 410 may include a via hole 420 through which light passes.

The reflective surface 430 may be extended to the light emitting surface to surround an upper portion and a side portion of the light source portion 100, and may reflect the light emitted from the light source portion 100 toward the via hole 420 of the light emitting surface 410.

Subsequently, the via hole 420 of the first light coupling portion 400 may face the side of the light cavity portion 200.

That is, the via hole 420 of the light emitting surface 410 may be arranged to correspond to the via hole 600 formed at the side of the light cavity portion 200.

Also, a diameter of the via hole 420 of the light emitting surface 410 may be equal to a diameter of the via hole 600 of the light cavity portion 200.

As the case may be, the diameter of the via hole 420 of the light emitting surface 410 may be different from the diameter of the via hole 600 of the light cavity portion 200.

In this case, the diameter of the via hole 420 of the light emitting surface 410 serves as an aperture of light, and may be smaller than the diameter of the via hole 600 of the light cavity portion 200.

This is to allow every light emitted from the via hole 420 of the light emitting surface 410 to enter the via hole 600 of the light cavity portion 200 without light loss.

Figure 4:
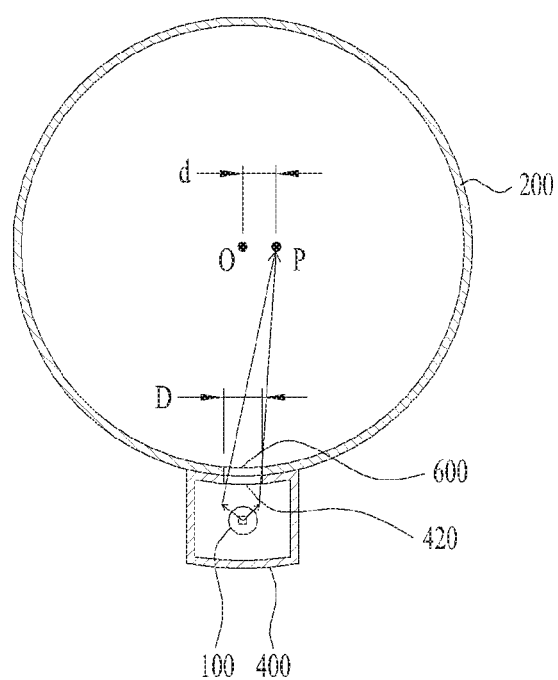
FIG. 4 is a view illustrating a diameter of a via hole of a first light coupling portion according to the first embodiment of the present invention.

FIG. 4 is a view illustrating a diameter of a via hole of a first light coupling portion according to the first embodiment of the present invention.

As shown in FIG. 4, the first light coupling portion 400 may include a light emitting surface 410 and a reflective surface 430.

In this case, the light emitting surface 410 may include a via hole 420 through which light passes.

That is, the via hole 420 of the light emitting surface 410 may be arranged to correspond to the via hole 600 formed at the side of the light cavity portion 200.

In this case, a diameter D of the via hole 420 of the light emitting surface 410 serves as an aperture of light, and may be varied depending on a distance between the reflective surface 430 and a focus point P of light reflected from the reflective surface 430.

At this time, the focus point P of light may be a point offset as much as a certain distance 'd' from a center point 'O' of the light cavity portion 200.

For example, the diameter D of the via hole 420 of the light emitting surface 410 may be reduced as the distance between the reflective surface 430 and the focus point P of light reflected from the reflective surface 430 is increased.

Also, the diameter D of the via hole 420 of the light emitting surface 410 may be equal to the diameter of the via hole 600 of the light cavity portion 200.

As the case may be, the diameter D of the via hole 420 of the light emitting surface 410 may be different from the diameter of the via hole 600 of the light cavity portion 200.

In this case, the diameter D of the via hole 420 of the light emitting surface 410 may be smaller than the diameter of the via hole 600 of the light cavity portion 200.

This is to allow every light emitted from the via hole 420 of the light emitting surface 410 to enter the via hole 600 of the light cavity portion 200 without light loss.

Figure 5:
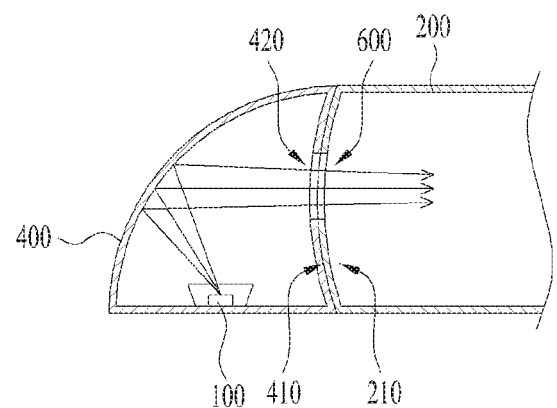
FIG. 5 is a view illustrating a position of a light emitting surface of a first light coupling portion according to the first embodiment of the present invention.

FIG. 5 is a view illustrating a position of a light emitting surface of a first light coupling portion according to the first embodiment of the present invention.

As shown in FIG. 5, the first light coupling portion 400 may include a light emitting surface 410 and a reflective surface 430.

In this case, the light emitting surface 410 may include a via hole 420 through which light passes.

The reflective surface 430 may be extended to the light emitting surface 410 to surround an upper portion and a side portion of the light source portion 100, and may reflect the light emitted from the light source portion 100 toward the via hole 420 of the light emitting surface 410.

Subsequently, the light emitting surface 410 of the first light coupling portion 400 may be in contact with the side 210 of the light cavity portion 200.

Therefore, if the side 210 of the light cavity portion 200 is a curved surface, the light emitting surface 410 of the first light coupling portion 400 may have a curved shape like the side 210 of the light cavity portion 200.

The shape of the light emitting surface 410 of the first light coupling portion 400 may be varied depending on the shape of the side 210 of the light cavity portion 200.

For example, if the light emitting surface 410 of the first light coupling portion 400 and the side 210 of the light cavity portion 200 are all curved surfaces, a curvature radius of the light emitting surface 410 of the first light coupling portion 400 and a curvature radius of the side of the light cavity portion 200 may be equal to each other.

As the case may be, if the side 210 of the light cavity portion 200 is a flat surface, the light emitting surface 410 of the first light coupling portion 400 may have a flat shape like the side 210 of the light cavity portion 200.

Also, when the light emitting surface 410 of the first light coupling portion 400 is in contact with the side 210 of the light cavity portion 200, the light emitting surface 410 of the first light coupling portion 400 and the side 210 of the light cavity portion 200 may be adhered to each other by an adhesive, or may be coupled to each other by a coupling member.

In this case, the adhesive may include a reflective material or the coupling member may be used as a reflective member to prevent light from leaking to the outside through a gap between a contact surface between the light emitting surface 410 of the first light coupling portion 400 and the side 210 of the light cavity portion 200.

Figure 6:
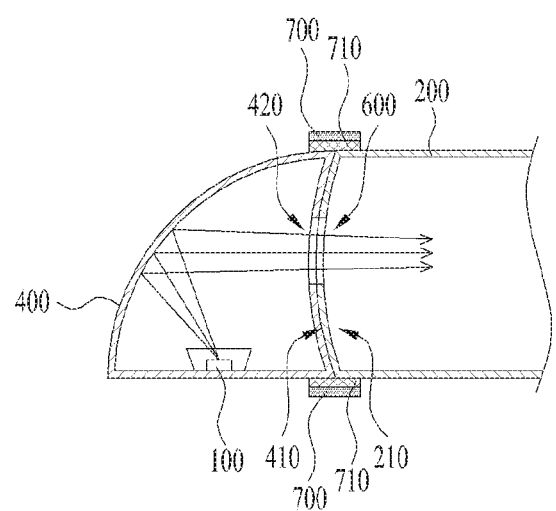
FIG. 6 is a view illustrating a position of a light shielding film of a first light coupling portion according to the first embodiment of the present invention.

FIG. 6 is a view illustrating a position of a light shielding film of a first light coupling portion according to the first embodiment of the present invention.

As shown in FIG. 6, the light emitting surface 410 of the first light coupling portion 400 may be in contact with the side 210 of the light cavity portion 200.

In this case, when the light emitting surface 410 of the first light coupling portion 400 is in contact with the side 210 of the light cavity portion 200, a light shielding film 700 may be formed near the contact surface between the light emitting surface 410 and the light cavity portion 200 to prevent light from leaking to the outside through the gap between the contact surface between the light emitting surface 410 and the side 210 of the light cavity portion 200.

In this case, the light shielding film 700 may be provided with a reflective layer 710 formed on a surface facing the contact surface between the light emitting surface 410 of the first light coupling portion 400 and the light cavity portion 200.

Subsequently, the reflective layer 710 may be coated with an infrared ray reflective material.

This is to prevent light from leaking to the outside and enhance gas sensing efficiency by reflecting light toward the inside.

As the case may be, instead of the light shielding film 700 in the present invention, an adhesive containing a reflective material may be used or a fastening member containing a reflective material may be used.

Figure 7:
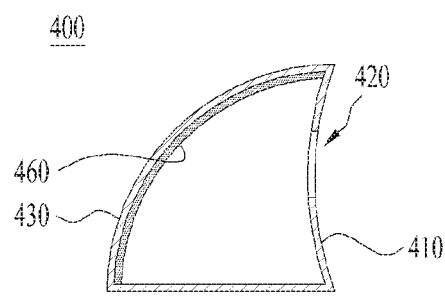
FIG. 7 is a view illustrating a reflective surface of a first light coupling portion according to the first embodiment of the present invention.

FIG. 7 is a view illustrating a reflective surface of a first light coupling portion according to the first embodiment of the present invention.

As shown in FIG. 7, the first light coupling portion 400 may include a light emitting surface 410 and a reflective surface 430.

In this case, the light emitting surface 410 may include a via hole 420 through which light passes.

The reflective surface 430 may be extended to the light emitting surface 410 to surround an upper portion and a side portion of the light source portion 100, and may reflect the light emitted from the light source portion 100 toward the via hole 420 of the light emitting surface 410.

In this case, the reflective surface 430 of the first light coupling portion may be coated with an infrared ray reflective material 460.

This is to improve gas sensing efficiency by enhancing reflectivity of light.

As the case may be, the infrared ray reflective material 460 may be coated on the light emitting surface 410 of the first light coupling portion.

In another case, the infrared ray reflective material 460 may be coated on a bottom surface of the first light coupling portion 400 located near the light source portion.

In other case, the infrared ray reflective material 460 may be coated on both the light emitting surface 410 of the first light coupling portion and the bottom surface of the first light coupling portion 400.

Figure 8:
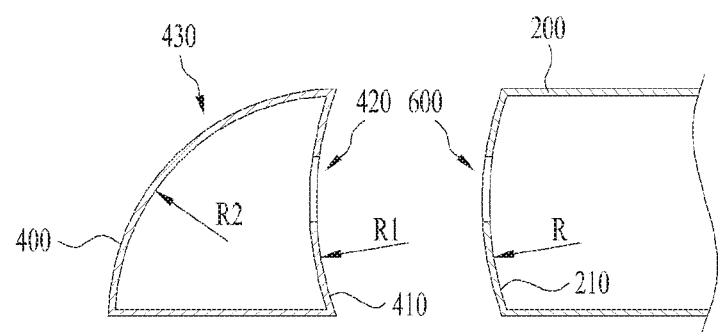
FIGS. 8 and 9 are views illustrating curvature radiuses of a reflective surface and a light emitting surface of a first light coupling portion according to the first embodiment of the present invention.
Figure 9:
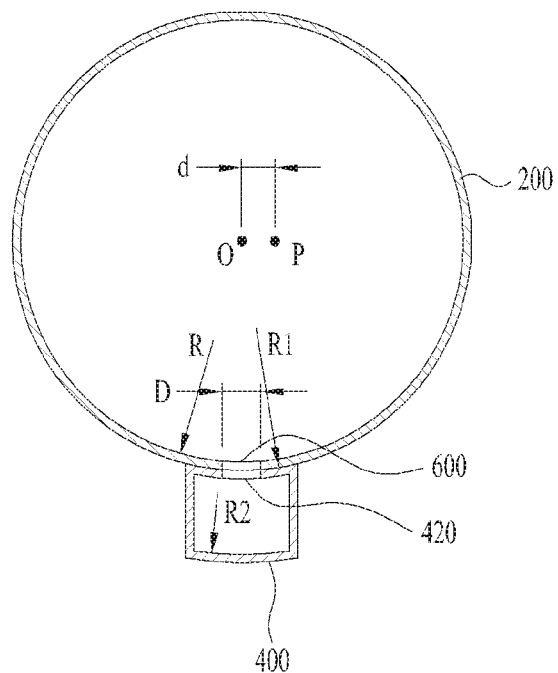

FIGS. 8 and 9 are views illustrating curvature radiuses of a reflective surface and a light emitting surface of a first light coupling portion according to the first embodiment of the present invention.

As shown in FIGS. 8 and 9, the first light coupling portion 400 may include a light emitting surface 410 and a reflective surface 430.

In this case, the light emitting surface 410 may include a via hole 420 through which light passes.

The reflective surface 430 may be extended to the light emitting surface 410 to surround an upper portion and a side portion of the light source portion 100, and may reflect the light emitted from the light source portion 100 toward the via hole 420 of the light emitting surface 410.

Subsequently, the via hole 420 of the first light coupling portion 400 may face the side of the light cavity portion 200.

That is, the via hole 420 of the light emitting surface 410 of the first light coupling portion 400 may be arranged to correspond to the via hole 600 formed at the side of the light cavity portion 200.

Next, the light emitting surface 410 of the first light coupling portion 400 may be a curved surface having a first curvature radius R1, and the reflective surface 430 of the first light coupling portion 400 may be a curved surface having a second curvature radius R2.

In this case, the first curvature radius R1 of the light emitting surface 410 may be different from the second curvature radius R2 of the reflective surface 430.

For example, the first curvature radius R1 of the light emitting surface 410 may be greater than the second curvature radius R2 of the reflective surface 430.

As the case may be, the first curvature radius R1 of the light emitting surface 410 may be equal to the curvature radius R of the side 210 of the light cavity portion 200.

Subsequently, as shown in FIG. 9, the second curvature radius R2 of the reflective surface 430 of the first light coupling portion 400 is to condense light, and may be varied depending on the distance between the reflective surface 430 and the focus point P of light reflected from the reflective surface 430.

In this case, the focus point P of light may be a point offset as much as a certain distance 'd' from the center point O of the light cavity portion 200.

For example, the second curvature radius R2 of the reflective surface 430 of the first light coupling portion 400 may be increased as the distance between the reflective surface 430 and the focus point P of light reflected from the reflective surface 430 is increased.

Figure 10:
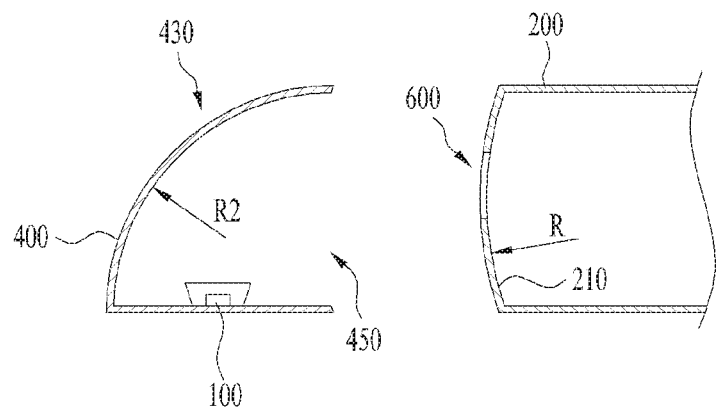
FIG. 10 is a view illustrating a first light coupling portion according to the second embodiment of the present invention.

FIG. 10 is a view illustrating a first light coupling portion according to the second embodiment of the present invention.

As shown in FIG. 10, the first light coupling portion 400 may reflect and condense the light emitted from the light source portion 100 toward the light cavity portion 200.

In this case, the first light coupling portion 400 may include an opening portion 450 facing the side 210 of the light cavity portion 200, and a reflective surface 430 extended from the opening portion 450 to surround an upper portion and a side portion of the light source portion 100, reflecting the light emitted from the light source portion 100 toward the opening portion 450.

In this case, the opening portion 450 of the first light coupling portion 400 may be arranged to correspond to the via hole 600 formed at the side 210 of the light cavity portion 200.

Subsequently, the reflective surface 430 of the first light coupling portion 400 may be a curved surface having a predetermined curvature radius R2.

In this case, the curvature radius R2 of the reflective surface 430 of the first light coupling portion 400 is to condense light, and may be varied depending on the distance between the reflective surface 430 and a focus point of light reflected from the reflective surface 430.

In this case, the focus point of light may be a point offset as much as a certain distance from the center point of the light cavity portion 200.

For example, the curvature radius R2 of the reflective surface 430 may be increased as the distance between the reflective surface 430 and the focus point of light reflected from the reflective surface 430.

Therefore, the curvature radius R2 of the reflective surface 430 of the first light coupling portion 400 may be smaller than the curvature radius R of the side 210 of the light cavity portion 200.

Figure 11:
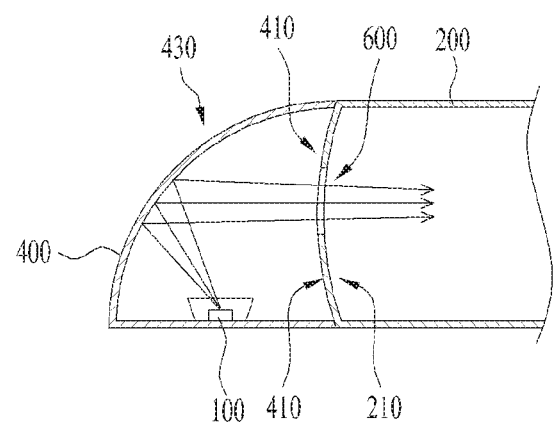
FIG. 11 is a view illustrating a position of an opening portion of a first light coupling portion according to the second embodiment of the present invention.

FIG. 11 is a view illustrating a position of an opening portion of a first light coupling portion according to the second embodiment of the present invention.

As shown in FIG. 11, the first light coupling portion 400 may include an opening portion 450 and a reflective surface 430.

In this case, the opening portion 450 may face the side 210 of the light cavity portion 200, and the reflective surface 430 may be extended from the opening portion 450 to surround an upper portion and a side portion of the light source portion 100 and reflect the light emitted from the light source portion 100 toward the opening portion 450.

In this case, the opening portion 450 of the first light coupling portion 400 may be arranged to correspond to the via hole 600 formed at the side 210 of the light cavity portion 200.

For example, an edge area of the opening portion 450 of the first light coupling portion 400 may be in contact with the side 210 of the light cavity portion 200.

Also, when the edge area of the opening portion 450 of the first light coupling portion 400 is in contact with the side 210 of the light cavity portion 200, the edge area of the opening portion 450 of the first light coupling portion 400 and the side 210 of the light cavity portion 200 may be adhered to each other by an adhesive, or may be coupled to each other by a coupling member.

In this case, the adhesive may include a reflective material or the coupling member may be used as a reflective member to prevent light from leaking to the outside through a gap between a contact surface between the edge area of the opening portion of the first light coupling portion 400 and the side 210 of the light cavity portion 200.

Figure 12:
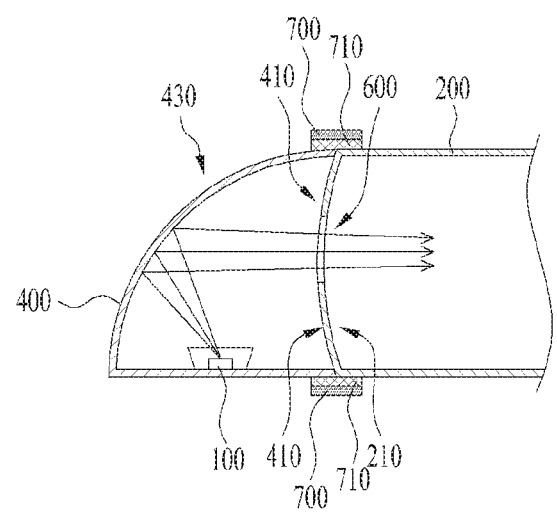
FIG. 12 is a view illustrating a light shielding film of a first light coupling portion according to the second embodiment of the present invention.

FIG. 12 is a view illustrating a light shielding film of a first light coupling portion according to the second embodiment of the present invention.

As shown in FIG. 12, the edge area of the opening portion 450 of the first light coupling portion 400 may be in contact with the side of the light cavity portion 200.

In this case, when the edge area of the opening portion 450 of the first light coupling portion 400 is in contact with the side 210 of the light cavity portion 200, a light shielding film 700 may be formed near the contact surface between the edge area of the opening portion 450 of the first light coupling portion 400 and the light cavity portion 200 to prevent light from leaking to the outside through the gap between the contact surface between the edge area of the opening portion 450 of the first light coupling portion 400 and the side of the light cavity portion 200.

In this case, the light shielding film 700 may be provided with a reflective layer 710 formed on a surface facing the contact surface between the edge area of the opening portion 450 of the first light coupling portion 400 and the light cavity portion 200.

Subsequently, the reflective layer 710 may be coated with an infrared ray reflective material.

This is to prevent light from leaking to the outside and enhance gas sensing efficiency by reflecting light toward the inside.

As the case may be, instead of the light shielding film 700 in the present invention, an adhesive containing a reflective material may be used or a fastening member containing a reflective material may be used.

Figure 13:
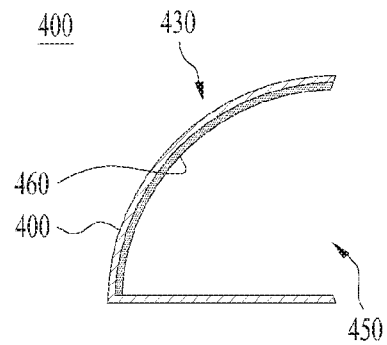
FIG. 13 is a view illustrating a reflective surface of a first light coupling portion according to the second embodiment of the present invention.

FIG. 13 is a view illustrating a reflective surface of a first light coupling portion according to the second embodiment of the present invention.

As shown in FIG. 13, the first light coupling portion 400 may include an opening portion 450 and a reflective surface 430.

In this case, the opening portion 450 may face the side 210 of the light cavity portion 200, and the reflective surface 430 may be extended from the opening portion 450 to surround an upper portion and a side portion of the light source portion 100 and reflect the light emitted from the light source portion 100 toward the opening portion 450.

The reflective surface 430 of the first light coupling portion 400 may be coated with an infrared ray reflective material 460.

This is to improve gas sensing efficiency by enhancing reflectivity of light.

As the case may be, the infrared ray reflective material 460 may be coated on a bottom surface of the first light coupling portion 400 located near the light source portion.

In another case, the infrared ray reflective material 460 may be coated on both the reflective surface 430 of the first light coupling portion and the bottom surface of the first light coupling portion 400.

Figure 14:
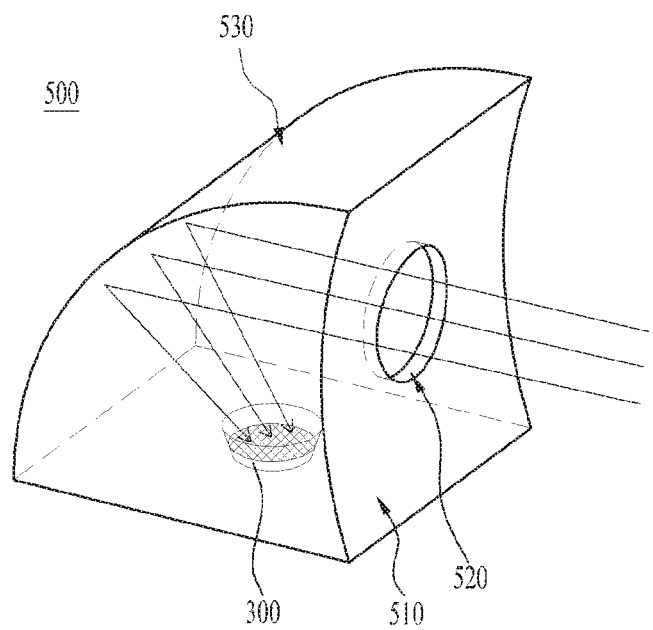
FIG. 14 is a view illustrating a second light coupling portion according to the first embodiment of the present invention.

FIG. 14 is a view illustrating a second light coupling portion according to the first embodiment of the present invention.

As shown in FIG. 14, the second light coupling portion 500 may reflect and condense light emitted from the light cavity portion toward the light detector 300.

In this case, the second light coupling portion 500 may include a light incident surface 510 having a via hole 520 through which incident light from the light cavity portion passes, and a reflective surface 530 extended to the light incident surface 510 to surround an upper portion and a side portion of the light detector 300, reflecting the light incident from the light cavity portion 200 toward the light detector 300.

Next, the light incident surface 510 of the second light coupling portion 500 may be a curved surface having a third curvature radius, and the reflective surface 530 of the second light coupling portion 500 may be a curved surface having a fourth curvature radius.

In this case, the third curvature radius of the light incident surface 510 may be different from the fourth curvature radius of the reflective surface 530.

For example, the third curvature radius of the light incident surface 510 may be greater than the fourth curvature radius of the reflective surface 530.

As the case may be, the third curvature radius of the light incident surface 510 of the second light coupling portion 500 may be equal to the curvature radius of the side of the light cavity portion.

Also, the fourth curvature radius of the reflective surface 530 may be varied depending on the distance between the reflective surface 530 and a detection area of the light detector 300.

For example, the fourth curvature radius of the reflective surface 530 may be increased as the distance between the reflective surface 530 and the detection area of the light detector 300 is increased.

Also, the via hole 520 of the light incident surface 510 may be arranged to correspond to a via hole formed at the side of the light cavity portion.

As the case may be, an infrared filter may be arranged in the via hole 520 of the light incident surface 510.

This is to enhance gas sensing efficiency by removing noise of light.

Figure 15:
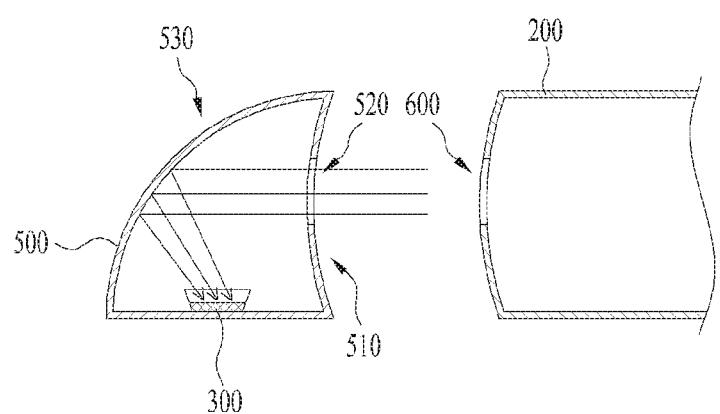
FIG. 15 is a view illustrating a position of a via hole of a second light coupling portion according to the first embodiment of the present invention.

FIG. 15 is a view illustrating a position of a via hole of a second light coupling portion according to the first embodiment of the present invention.

As shown in FIG. 15, the second light coupling portion 500 may include a light incident surface 510 and a reflective surface 530.

In this case, the light incident surface 510 may include a via hole 520 through which light passes.

The reflective surface 530 may be extended to the light incident surface 510 to surround an upper portion and a side portion of the light detector 300, and may reflect the light incident from the light cavity portion 200 toward the light detector 300.

Subsequently, the via hole 520 of the second light coupling portion 500 may face the side 210 of the light cavity portion 200.

That is, the via hole 520 of the light incident surface 510 may be arranged to correspond to the via hole 600 formed at the side 210 of the light cavity portion 200.

Also, a diameter of the via hole 520 of the light incident surface 510 may be equal to a diameter of the via hole 500 of the light cavity portion 200.

As the case may be, the diameter of the via hole 520 of the light incident surface 510 may be different from the diameter of the via hole 600 of the light cavity portion 200.

In this case, the diameter of the via hole 520 of the light incident surface 510 may be greater than the diameter of the via hole 600 of the light cavity portion 200.

This is to allow every light incident from the via hole 600 of the light cavity portion 200 to enter the via hole 520 of the light incident surface 510 without light loss.

Figure 16:
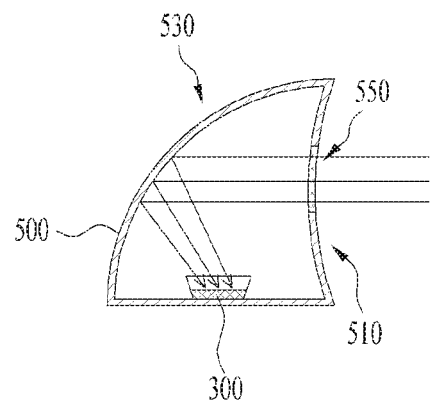
FIG. 16 is a view illustrating an infrared filter of a second light coupling portion according to the first embodiment of the present invention.

FIG. 16 is a view illustrating an infrared filter of a second light coupling portion according to the first embodiment of the present invention.

As shown in FIG. 16, the second light coupling portion 500 may include a light incident surface 510 and a reflective surface 530.

In this case, the light incident surface 510 may include a via hole through which light passes.

The reflective surface 530 may be extended to the light incident surface 510 to surround an upper portion and a side portion of the light detector 300, and may reflect the light incident from the light cavity portion toward the light detector 300.

Also, the via hole of the light incident surface 510 may be arranged to correspond to the via hole formed at the side of the light cavity portion.

In this case, an infrared filter 550 may be arranged in the via hole of the light incident surface 510.

This is to enhance gas sensing efficiency by removing noise of light.

For example, since the infrared filter 550 transmits only light of an infrared wavelength range and shields light other than the infrared wavelength range, the light detector 300 may receive only light of the infrared wavelength range, whereby gas detection efficiency may be enhanced.

Figure 17:
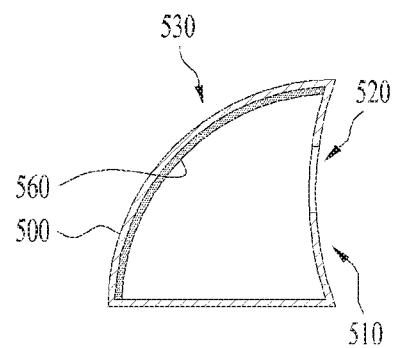
FIG. 17 is a view illustrating a reflective surface of a second light coupling portion according to the first embodiment of the present invention.

FIG. 17 is a view illustrating a reflective surface of a second light coupling portion according to the first embodiment of the present invention.

As shown in FIG. 17, the second light coupling portion 500 may include a light incident surface 510 and a reflective surface 530.

In this case, the light incident surface 510 may include a via hole 520 through which light passes.

The reflective surface 530 may be extended to the light incident surface 510 to surround an upper portion and a side portion of the light detector, and may reflect the light incident from the light cavity portion 200 toward the light detector.

In this case, the reflective surface 530 of the second light coupling portion 500 may be coated with an infrared ray reflective material 560.

This is to improve gas sensing efficiency by enhancing reflectivity of light.

As the case may be, the infrared ray reflective material 560 may be coated on the light incident surface 510 of the second light coupling portion 500.

In another case, the infrared ray reflective material 560 may be coated on a bottom surface of the second light coupling portion 500 located near the light detector.

In other case, the infrared ray reflective material 560 may be coated on both the reflective surface 530 of the second light coupling portion 500 and the bottom surface of the second light coupling portion 500.

Figure 18:
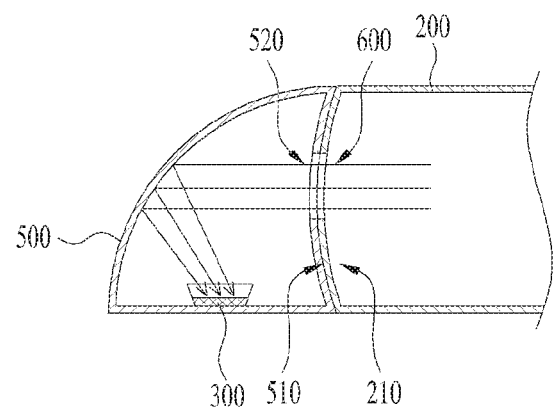
FIG. 18 is a view illustrating a position of a light incident surface of a second light coupling portion according to the first embodiment of the present invention.

FIG. 18 is a view illustrating a position of a light incident surface of a second light coupling portion according to the first embodiment of the present invention.

As shown in FIG. 18, the second light coupling portion 500 may include a light incident surface 510 and a reflective surface 530.

In this case, the light incident surface 510 may include a via hole 520 through which light passes.

The reflective surface 530 may be extended to the light incident surface 510 to surround an upper portion and a side portion of the light detector, and may reflect the light incident from the light cavity portion toward the light detector.

Subsequently, the light incident surface 510 of the second light coupling portion 500 may be in contact with the side 210 of the light cavity portion 200.

Therefore, if the side 210 of the light cavity portion 200 is a curved surface, the light incident surface 510 of the second light coupling portion 500 may have a curved shape like the side 210 of the light cavity portion 200.

The shape of the light incident surface 510 of the second light coupling portion 500 may be varied depending on the shape of the side 210 of the light cavity portion 200.

For example, if the light incident surface 510 of the second light coupling portion 500 and the side 210 of the light cavity portion 200 are all curved surfaces, a curvature radius of the light incident surface 510 of the second light coupling portion 500 and a curvature radius of the side of the light cavity portion 200 may be equal to each other.

As the case may be, if the side 210 of the light cavity portion 200 is a flat surface, the light incident surface 510 of the second light coupling portion 500 may have a flat shape like the side 210 of the light cavity portion 200.

Also, when the light incident surface 510 of the second light coupling portion 500 is in contact with the side 210 of the light cavity portion 200, the light incident surface 510 of the second light coupling portion 500 and the side 210 of the light cavity portion 200 may be adhered to each other by an adhesive, or may be coupled to each other by a coupling member.

In this case, the adhesive may include a reflective material or the coupling member may be used as a reflective member to prevent light from leaking to the outside through a gap between a contact surface between the light incident surface 510 of the second light coupling portion 500 and the side 210 of the light cavity portion 200.

Figure 19:
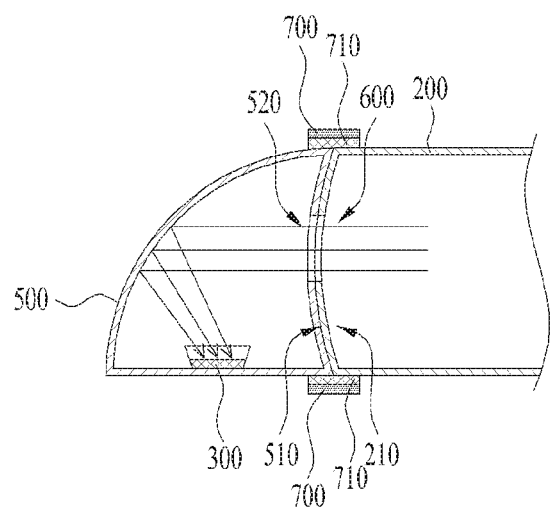
FIG. 19 is a view illustrating a light shielding film of a second light coupling portion according to the first embodiment of the present invention.

FIG. 19 is a view illustrating a light shielding film of a second light coupling portion according to the first embodiment of the present invention.

As shown in FIG. 19, the light incident surface of the first light coupling portion 500 may be in contact with the side of the light cavity portion 200.

In this case, when the light incident surface 510 of the second light coupling portion 500 is in contact with the side 210 of the light cavity portion 200, a light shielding film 700 may be formed near the contact surface between the light incident surface 510 and the light cavity portion 200 to prevent light from leaking to the outside through the gap between the contact surface between the light incident surface 510 and the side of the light cavity portion 200.

In this case, the light shielding film 700 may be provided with a reflective layer 710 formed on a surface facing the contact surface between the light incident surface 510 of the second light coupling portion 500 and the light cavity portion 200.

Subsequently, the reflective layer 710 may be coated with an infrared ray reflective material.

This is to prevent light from leaking to the outside and enhance gas sensing efficiency by reflecting light toward the inside.

As the case may be, instead of the light shielding film 700 in the present invention, an adhesive containing a reflective material may be used or a fastening member containing a reflective material may be used.

Figure 20:
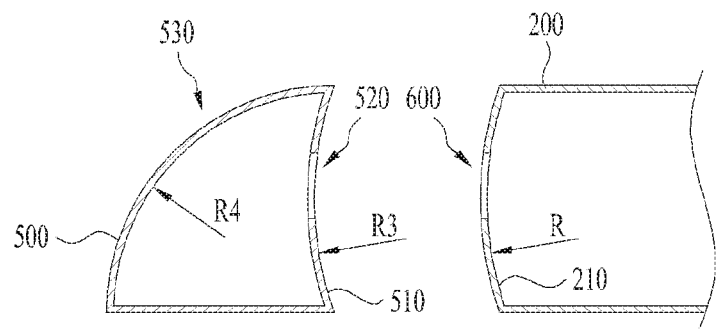
FIGS. 20 and 21 are views illustrating a curvature radius of a reflective surface and a light incident surface of a second light coupling portion according to the first embodiment of the present invention.
Figure 21:
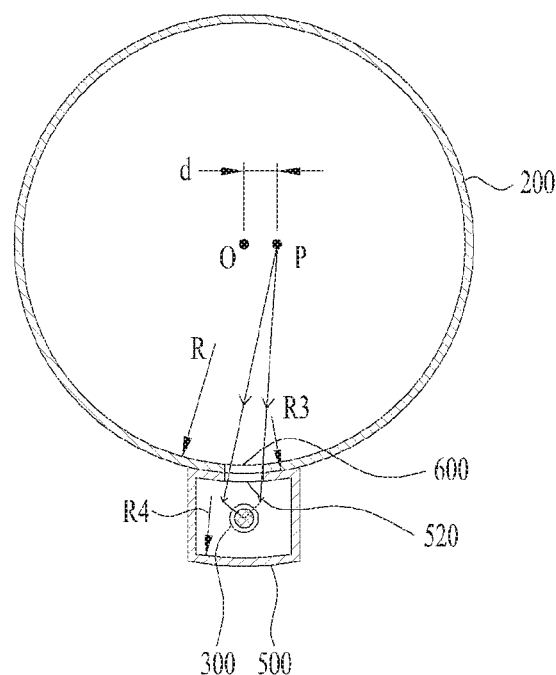

FIGS. 20 and 21 are views illustrating a curvature radius of a reflective surface and a light incident surface of a second light coupling portion according to the first embodiment of the present invention.

As shown in FIGS. 20 and 21, the second light coupling portion 500 may include a light incident surface 510 and a reflective surface 530.

In this case, the light incident surface 510 may include a via hole 520 through which light passes.

The reflective surface 530 may be extended to the light incident surface 510 to surround an upper portion and a side portion of the light detector, and may reflect the light incident from the light cavity portion 200 toward the light detector.

Subsequently, the via hole 520 of the second light coupling portion 500 may face the side 210 of the light cavity portion 200.

That is, the via hole 520 of the light incident surface 510 of the second light coupling portion 500 may be arranged to correspond to the via hole 600 formed at the side 210 of the light cavity portion 200.

Next, the light incident surface 510 of the second light coupling portion 500 may be a curved surface having a third curvature radius R3, and the reflective surface 530 of the second light coupling portion 500 may be a curved surface having a fourth curvature radius R4.

In this case, the third curvature radius R3 of the light incident surface 510 may be different from the fourth curvature radius R4 of the reflective surface 530.

For example, the third curvature radius R3 of the light incident surface 510 may be greater than the fourth curvature radius R4 of the reflective surface 530.

As the case may be, the third curvature radius R3 of the light incident surface 510 of the second light coupling portion 500 may be equal to the curvature radius R of the side 210 of the light cavity portion 200.

Subsequently, as shown in FIG. 21, the fourth curvature radius R4 of the reflective surface 530 of the second light coupling portion 500 is to condense light, and may be varied depending on the distance between the reflective surface 530 and the focus point P of light reflected from the reflective surface 530.

In this case, the focus point P of light may be a point offset as much as a certain distance 'd' from a center point O of the light cavity portion 200.

For example, the fourth curvature radius R4 of the reflective surface 530 of the second light coupling portion 500 may be increased as the distance between the reflective surface 530 and the focus point P of light reflected from the reflective surface 530 is increased.

Also, the fourth curvature radius R4 of the reflective surface 530 may be varied depending on the distance between the reflective surface 530 and a detection area of the light detector 300.

For example, the fourth curvature radius R4 of the reflective surface 530 may be increased as the distance between the reflective surface 530 and the detection area of the light detector 300 is increased.

Figure 22:
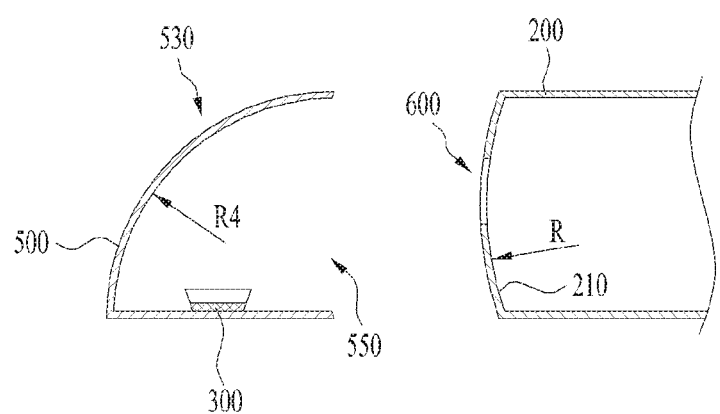
FIG. 22 is a view illustrating a second light coupling portion according to the second embodiment of the present invention.

FIG. 22 is a view illustrating a second light coupling portion according to the second embodiment of the present invention.

As shown in FIG. 22, the second light coupling portion 500 may reflect and condense light reflected from the light cavity portion toward the light detector 300.

In this case, the second light coupling portion 500 may include an opening portion 550 through which incident light from the light cavity portion 200 passes, and a reflective surface 530 extended to the opening portion 550 to surround an upper portion and a side portion of the light detector 300, reflecting the light incident from the light cavity portion 200 toward the light detector 300.

Next, the reflective surface 530 of the second light coupling portion 500 may be a curved surface having a fourth curvature radius R4.

In this case, the fourth curvature radius R4 of the reflective surface 530 of the second light coupling portion 500 is to condense light, and may be varied depending on the distance between the reflective surface 530 and a focus point of light reflected from the reflective surface 530.

In this case, the focus point of light may be a point offset as much as a certain distance from the center point of the light cavity portion 200.

For example, the fourth curvature radius R4 of the reflective surface 530 may be increased as the distance between the reflective surface 530 and the focus point of light reflected from the reflective surface 530.

Therefore, the fourth curvature radius R4 of the reflective surface 530 of the second light coupling portion 500 may be smaller than the curvature radius R of the side 210 of the light cavity portion 200.

Also, the fourth curvature radius R4 of the reflective surface 530 may be varied depending on the distance between the reflective surface 530 and a detection area of the light detector 300.

For example, the fourth curvature radius R4 of the reflective surface 530 may be increased as the distance between the reflective surface 530 and the detection area of the light detector 300 is increased.

Figure 23:
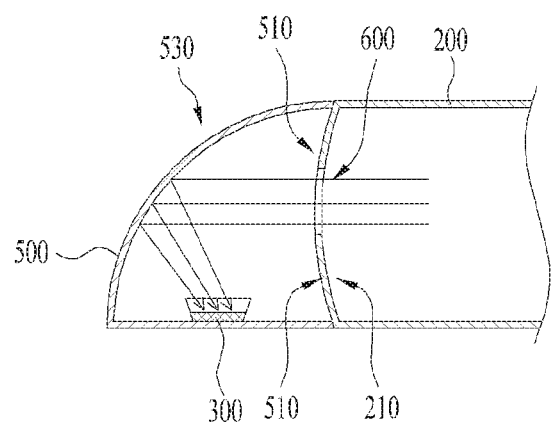
FIG. 23 is a view illustrating a position of an opening portion of a second light coupling portion according to the second embodiment of the present invention.

FIG. 23 is a view illustrating a position of an opening portion of a second light coupling portion according to the second embodiment of the present invention.

As shown in FIG. 23, the second light coupling portion 500 may include an opening portion 550 and a reflective surface 530.

In this case, the opening portion 550 may face the side 210 of the light cavity portion 200, and the reflective surface 530 may be extended from the opening portion 550 to surround an upper portion and a side portion of the light detector 300 and reflect the light incident from the light cavity portion 200 toward the light detector 300.

In this case, the opening portion 550 of the second light coupling portion 500 may be arranged to correspond to the via hole 600 formed at the side 210 of the light cavity portion 200.

For example, an edge area of the opening portion 550 of the second light coupling portion 500 may be in contact with the side 210 of the light cavity portion 200.

Also, when the edge area of the opening portion 550 of the second light coupling portion 500 is in contact with the side 210 of the light cavity portion 200, the edge area of the opening portion 550 of the second light coupling portion 500 and the side 210 of the light cavity portion 200 may be adhered to each other by an adhesive, or may be coupled to each other by a coupling member.

In this case, the adhesive may include a reflective material or the coupling member may be used as a reflective member to prevent light from leaking to the outside through a gap between a contact surface between the edge area of the opening portion of the second light coupling portion 500 and the side 210 of the light cavity portion 200.

Figure 24:
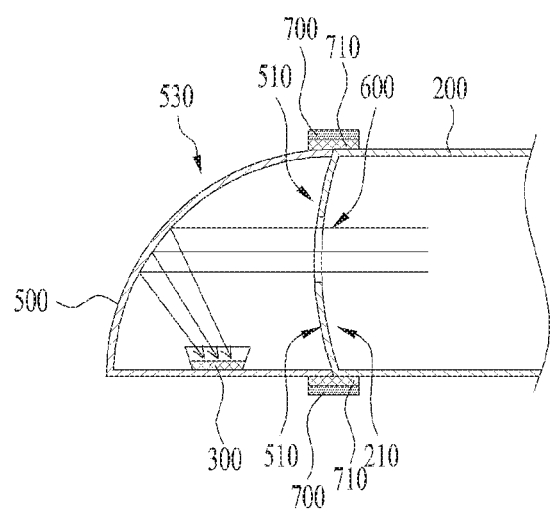
FIG. 24 is a view illustrating a light shielding film of a second light coupling portion according to the second embodiment of the present invention.

FIG. 24 is a view illustrating a light shielding film of a second light coupling portion according to the second embodiment of the present invention.

As shown in FIG. 24, the edge area of the opening portion 550 of the second light coupling portion 500 may be in contact with the side of the light cavity portion 200.

In this case, when the edge area of the opening portion 550 of the second light coupling portion 500 is in contact with the side 210 of the light cavity portion 200, a light shielding film 700 may be formed near the contact surface between the edge area of the opening portion 550 of the second light coupling portion 500 and the light cavity portion 200 to prevent light from leaking to the outside through the gap between the contact surface between the edge area of the opening portion 550 of the second light coupling portion 500 and the side of the light cavity portion 200.

In this case, the light shielding film 700 may be provided with a reflective layer 710 formed on a surface facing the contact surface between the edge area of the opening portion 550 of the second light coupling portion 500 and the light cavity portion 200.

Subsequently, the reflective layer 710 may be coated with an infrared ray reflective material.

This is to prevent light from leaking to the outside and enhance gas sensing efficiency by reflecting light toward the inside.

As the case may be, instead of the light shielding film 700 in the present invention, an adhesive containing a reflective material may be used or a fastening member containing a reflective material may be used.

Figure 25:
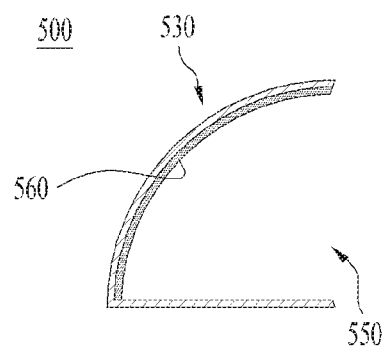
FIG. 25 is a view illustrating a reflective surface of a second light coupling portion according to the second embodiment of the present invention.
Figure 26:
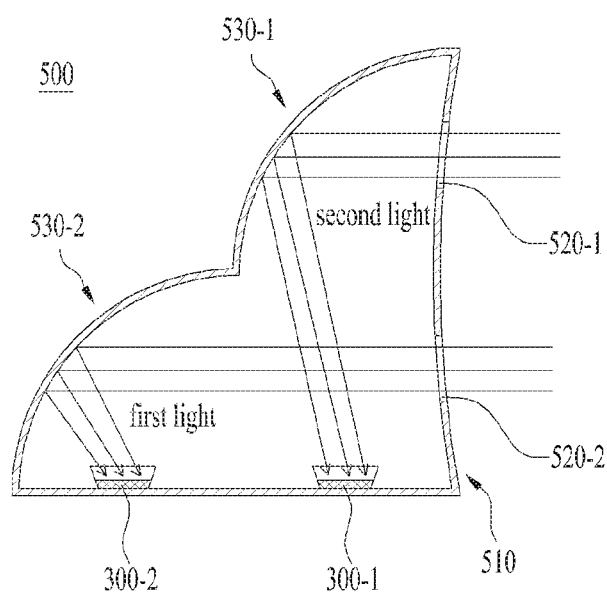
FIGS. 26 to 29 are views illustrating a second light coupling portion according to the second embodiment of the present invention.
Figure 27:
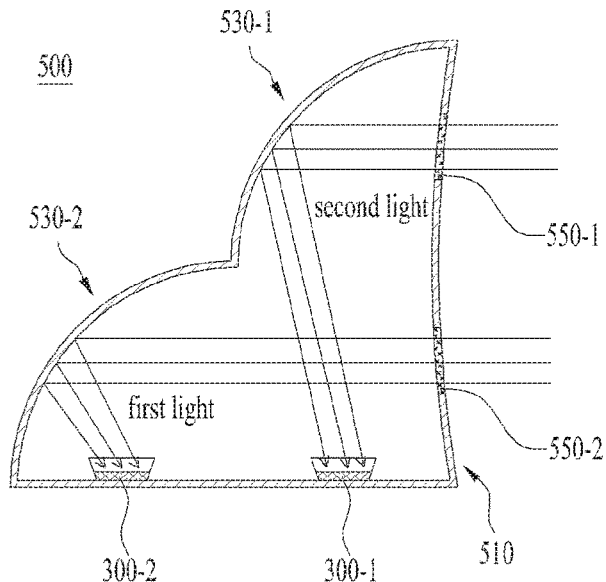

FIG. 25 is a view illustrating a reflective surface of a second light coupling portion according to the second embodiment of the present invention.

As shown in FIG. 25, the second light coupling portion 500 may include an opening portion 550 and a reflective surface 530.

In this case, the opening portion 550 may face the side 210 of the light cavity portion 200, and the reflective surface 530 may be extended from the opening portion 550 to surround an upper portion and a side portion of the light source portion 100 and reflect the light incident from the light source portion 100 toward the light detector 300.

The reflective surface 530 of the second light coupling portion 500 may be coated with an infrared ray reflective material 560.

This is to improve gas sensing efficiency by enhancing reflectivity of light.

As the case may be, the infrared ray reflective material 560 may be coated on a bottom surface of the second light coupling portion 500 located near the light detector.

In another case, the infrared ray reflective material 460 may be coated on both the reflective surface 530 of the second light coupling portion and the bottom surface of the second light coupling portion 500.

FIGS. 26 to 29 are views illustrating a second light coupling portion according to the second embodiment of the present invention.

As shown in FIGS. 26 to 29, the second light coupling portion 500 may reflect and condense light reflected from the light cavity portion 200 toward the light detector 300.

In this case, the second light coupling portion 500 may include a light incident surface 510 having a first via hole 520-1 through which first light incident from the light cavity portion passes and a second via hole 520-2 through which second light passes, a first reflective surface 530-1 extended to the light incident surface 510 to surround an upper portion and a side portion of a first light detector 300-1, reflecting the first light incident from the light cavity portion 200 toward the first light detector 300-1, and a second reflective surface 530-2 extended to the light incident surface 510 to surround an upper portion and a side portion of a second light detector 300-2, reflecting the second light incident from the light cavity portion 200 toward the second light detector 300-2.

In this case, the first and second via holes 520-1 and 520-2 of the light incident surface 510 of the second light coupling portion 500 may be arranged to correspond to the via hole formed at the side 210 of the light cavity portion 200.

As the case may be, a first filter 550-1 for transmitting only a wavelength range of the first light may be arranged in the first via hole 520-1 of the light incident surface 510, and a second filter 550-2 for transmitting only a wavelength range of the second light may be arranged in the second via hole 520-2 of the light incident surface 510.

This is to enhance gas sensing efficiency by removing noise of light.

Figure 28:
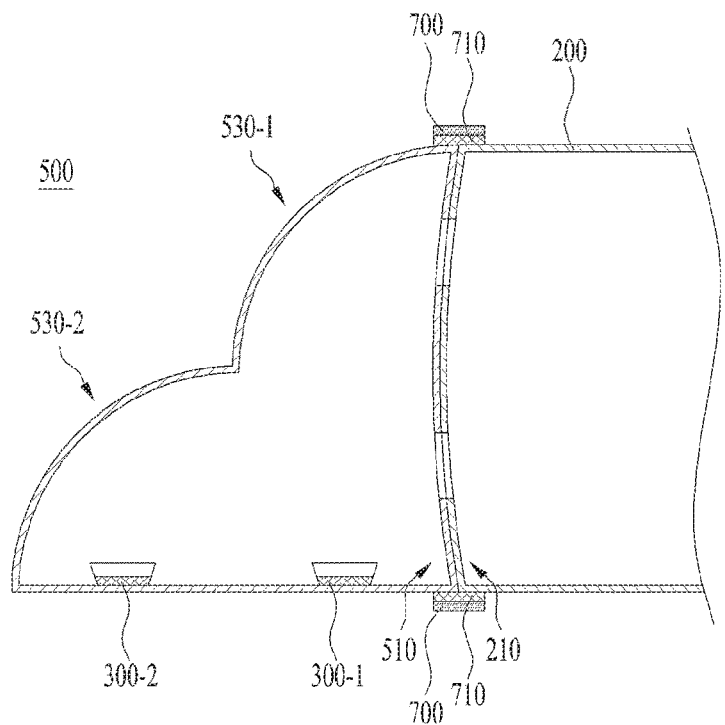
Figure 29:
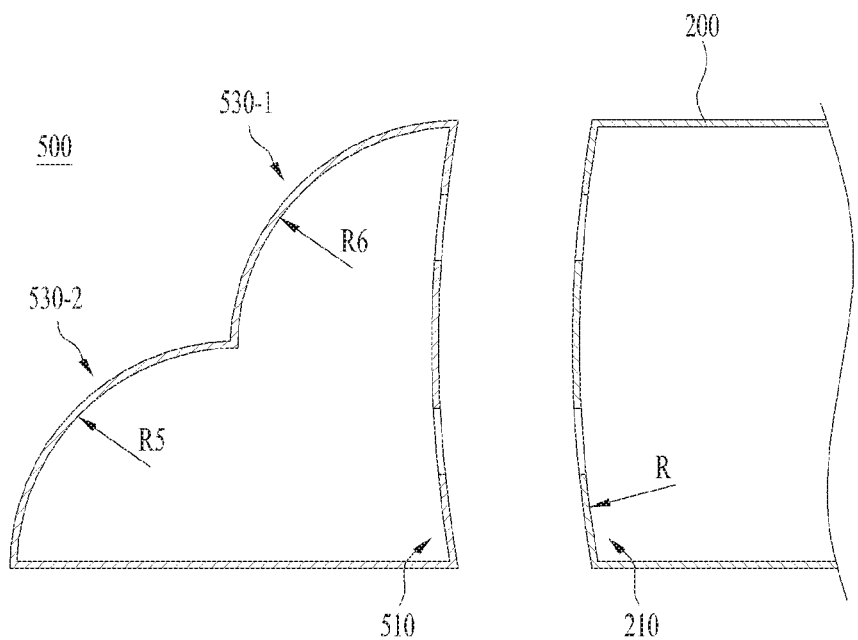

Next, as shown in FIG. 28, the light incident surface 510 of the second light coupling portion 500 may be in contact with the side 210 of the light cavity portion 200.

In this case, a light shielding film 700 may be formed near the contact surface 210 between the light incident surface 510 of the second light coupling portion 500 and the light cavity portion 200.

For example, the light shielding film 700 may be provided with a reflective layer 710 formed on a surface facing the contact surface between the light incident surface 510 and the light cavity portion 200.

This is to enhance gas sensing efficiency by reflecting light toward the inside.

Also, the first and second reflective surfaces 530-1 and 530-2 of the second light coupling portion 500 may be coated with an infrared ray reflective material.

This is to enhance gas sensing efficiency by enhancing reflectivity of light.

The light incident surface 510 may be a curved surface having a fifth curvature radius R5, the first reflective surface 530-1 may be a curved surface having a sixth curvature radius R6, and the second reflective surface 530-2 may be a curved surface having a seventh curvature radius R7.

In this case, the fifth, sixth and seventh curvature radiuses R5, R6 and R7 may be different from one another.

For example, the fifth curvature radius R5 of the light incident surface 510 may be greater than the sixth curvature radius R6 of the first reflective surface 530-1 and the seventh curvature radius R7 of the second reflective surface 530-2.

In this case, the fifth curvature radius R5 of the light incident surface 510 of the second light coupling portion 500 may be equal to the curvature radius R of the side 210 of the light cavity portion 200.

Also, the sixth curvature radius R6 of the first reflective surface 530-1 may be varied depending on the distance between the first reflective surface 530-1 and a detection area of the first light detector 300-1.

For example, the sixth curvature radius R6 of the first reflective surface 530-1 may be increased as the distance between the first reflective surface 530-1 and the detection area of the first light detector 300-1 is increased.

Subsequently, the seventh curvature radius R7 of the second reflective surface 530-2 may be varied depending on the distance between the second reflective surface 530-2 and a detection area of the second light detector 300-2.

For example, the seventh curvature radius R7 of the second reflective surface 530-2 may be increased as the distance between the second reflective surface 530-2 and the detection area of the second light detector 300-2 is increased.

Figure 30:
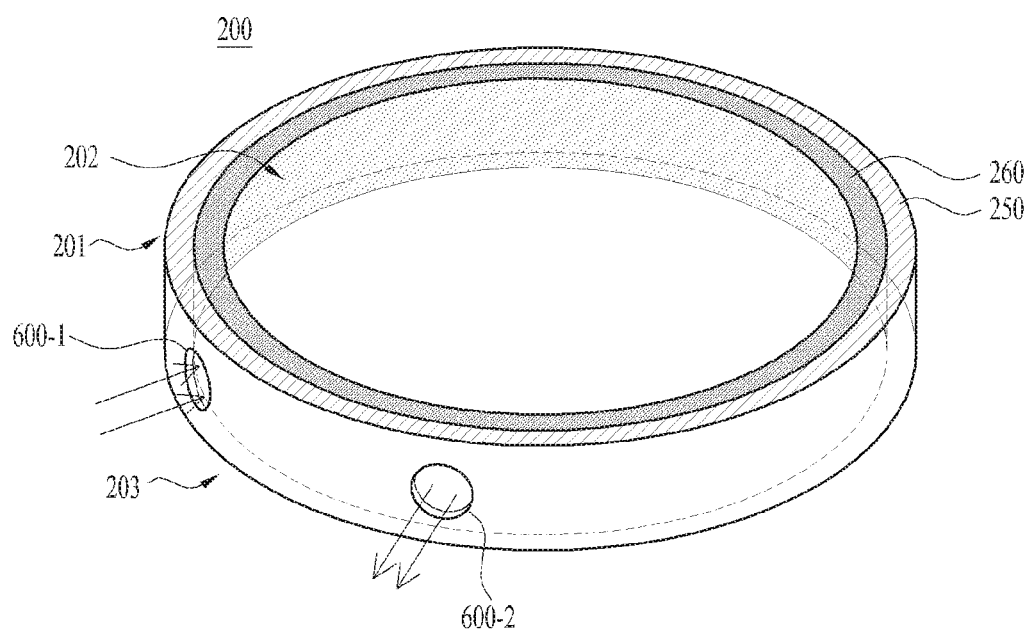
FIGS. 30 and 31 are views illustrating a light cavity portion according to the present invention.
Figure 31:
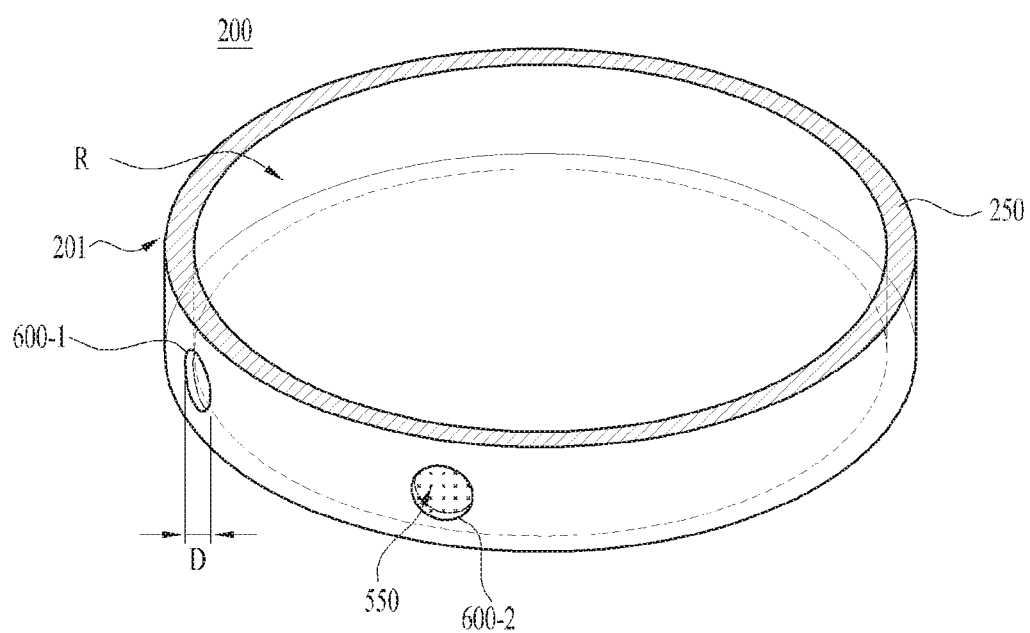

FIGS. 30 and 31 are views illustrating a light cavity portion according to the present invention.

As shown in FIGS. 30 and 31, the light cavity portion 200 may multi-reflect light emitted from the light source portion.

In this case, the light cavity portion 200 may have a cylindrical body portion of which upper and lower surfaces 202 and 203 are flat surfaces and side 201 is a curved surface.

The light cavity portion 200 may include a first via hole 600-1 and a second via hole 600-2 at the side.

In this case, the first via hole 600-1 may allow the light emitted from the light source portion to enter the light cavity portion 200.

Also, the second via hole 600-2 may allow the light multi-reflected inside the light cavity portion 200 to be emitted to the light detector.

Subsequently, an infrared ray reflective material may be coated on the inside of the side of the light cavity portion 200.

This is because that it is possible to improve gas sensing efficiency by enhancing reflectivity of light.

The first via hole 600-1 may be formed to correspond to the first light coupling portion, and the second via hole 600-2 may be formed to correspond to the second light coupling portion.

In this case, a diameter of the first via hole 600-1 serves as an aperture of light, and may be varied depending on a distance between a reflective surface of the first light coupling portion and a focus point of light reflected from the reflective surface.

At this time, the focus point of light may be a point offset as much as a certain distance from a center point of the light cavity portion 200.

For example, the diameter of the first via hole 600-1 may be reduced as the distance between the reflective surface of the first light coupling portion and the focus point of light reflected from the reflective surface is increased.

Also, as shown in FIG. 31, an infrared filter 550 may be arranged in the second via hole 600-2.

This is to enhance gas sensing efficiency by removing noise of light.

Subsequently, the side 201 of the light cavity portion 200 may be a curved surface having a predetermined curvature radius R.

In this case, the curvature radius R may be varied depending on a side 201 of the light cavity portion 200 and a focus point of light reflected from the side 201 of the light cavity portion 200.

At this time, the focus point of light may be a point offset as much as a certain distance from the center point of the light cavity portion 200.

For example, the curvature radius R may be increased as the distance between the side 201 of the light cavity portion 200 and the focus point of light reflected from the side 201 of the light cavity portion 200 is increased.

Figure 32:
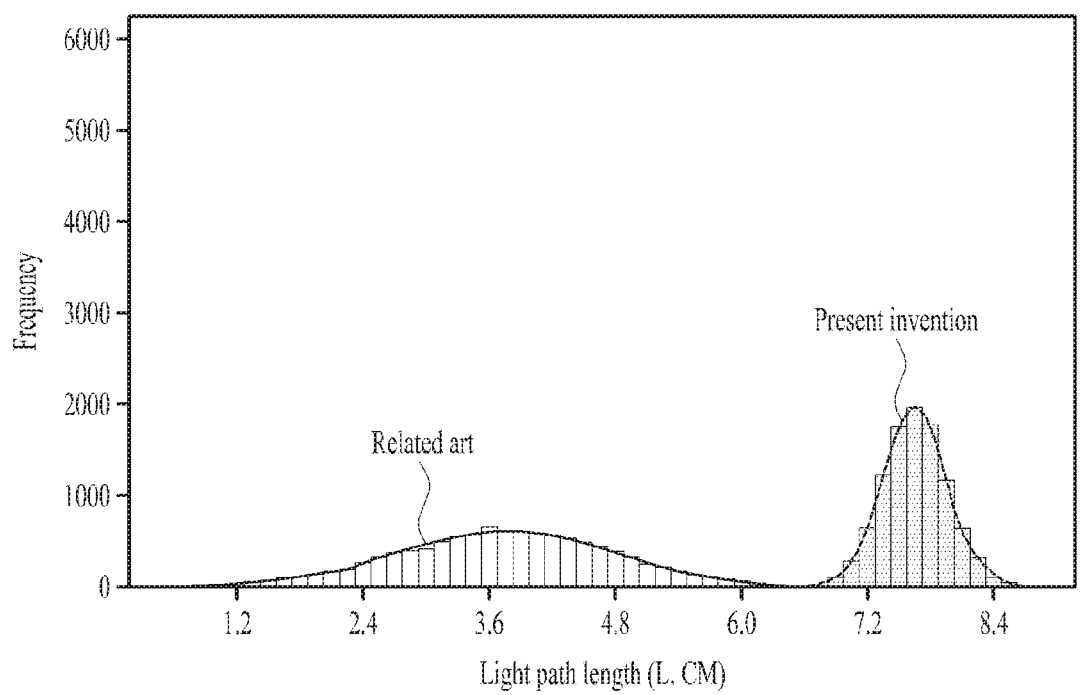
FIG. 32 is a graph illustrating a light path length of a gas sensor according to the present invention.
Figure 33:
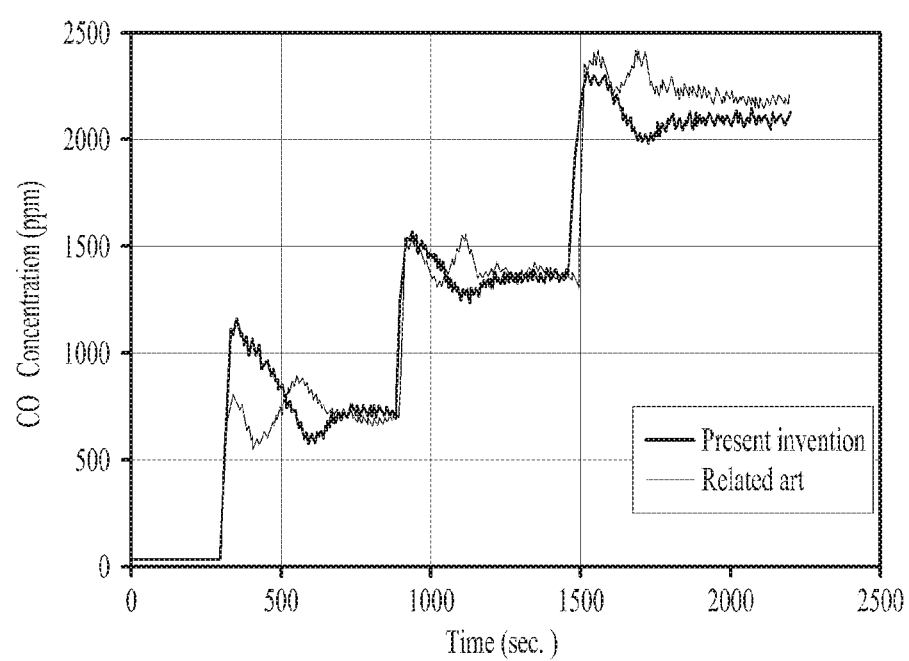
FIG. 33 is a graph illustrating performance of a gas sensor according to the present invention.

FIG. 32 is a graph illustrating a light path length of a gas sensor according to the present invention, and FIG. 33 is a graph illustrating performance of a gas sensor according to the present invention.

As shown in FIG. 32, it is noted from the gas sensor of the present invention that a light path length according to multi-reflection of light has been more increased than that of the existing gas sensor.

Since the gas sensor is favorable for miniaturization if the light path length is long, the light path length of the gas sensor of the present invention is more increased than that of the existing gas sensor, whereby the gas sensor of the present invention is suitable for miniaturization.

For example, although the gas sensor of the related art represents an effective light path of about 3.78 cm and an error rate of ±15.65% during gas measurement of about 1000 ppm, the gas sensor of the present invention represents an effective light path of about 7.65 cm and an error rate of ±8% during gas measurement of about 1000 ppm. Therefore, it is noted that the gas sensor of the present invention is suitable for miniaturization.

As shown in FIG. 33, it is noted from the gas sensor of the present invention that measurement performance of a gaseous concentration is similar to or more improved than measurement performance of a gaseous concentration in the existing gas sensors.

Therefore, it is noted from the present invention that it is possible to miniaturize the gas sensor by making sure of an effective light path length and that measurement performance of gas may be improved.

As described above, according to the present invention, it is possible to make sure of a long light path while miniaturizing an overall size of the gas sensor by using the first light coupling portion for reflecting and condensing light emitted from the light source portion toward the light cavity portion and the second light coupling portion for reflecting and condensing the light reflected from the light cavity portion to the light detector.

Also, according to the present invention, it is possible to enhance gas sensing efficiency by making sure of a long light path as the focus of light reaches an optimal position by adjusting the curvature radius of each reflective surface of the first and second light coupling portions.

Also, according to the present invention, it is possible to enhance gas sensing efficiency by blocking light leakage to the outside by arranging the light shielding film near the contact surface between the first and second light coupling portions and the light cavity portion.

Also, according to the present invention, it is possible to enhance gas sensing efficiency by enhancing light reflectivity by coating inner surfaces of the first and second light coupling portions and the light cavity portion with an infrared reflective material.

Also, according to the present invention, it is possible to enhance gas sensing efficiency by removing noise of incident light by arranging the light filter on the light incident surface of the second light coupling portion.

Also, according to the present invention, it is possible to enhance gas sensing efficiency by arranging the plurality of via holes and the plurality of detectors in the second light coupling portion.

Mode for Carrying Out the Invention

The gas sensor according to the present invention is not limited to the configuration and methods of the aforementioned embodiments, and all or some of the aforementioned embodiments may selectively be configured in combination so that various modifications may be made in the aforementioned embodiments.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention.

INDUSTRIAL APPLICABILITY

The present invention relates to a gas sensor using an NDIR (Non-Dispersive Infra-Red) system. Therefore, the present invention has industrial applicability.

The invention claimed is:

1. A gas sensor comprising:
   a light source portion for emitting light;
   a light cavity portion for multi-reflecting the emitted light;
   a light detector for detecting the multi-reflected light;
   a first light coupling portion for reflecting and condensing the light emitted from the light source portion toward the light cavity portion; and
   a second light coupling portion for reflecting and condensing the light reflected from the light cavity portion toward the light detector,
   wherein the first light coupling portion includes:
      a light emitting surface facing a side of the light cavity portion and having a via hole through which the light passes; and
      a reflective surface extended to the light emitting surface to surround an upper portion and a side portion of the light source portion and reflecting the light emitted from the light source portion toward the via hole of the light emitting surface, and
   wherein the via hole of the light emitting surface has a diameter varied depending on a distance between the reflective surface and a focus point of the light reflected from the reflective surface.

2. The gas sensor of claim 1, wherein the via hole of the light emitting surface is arranged to correspond to a via hole formed at the side of the light cavity portion.

3. The gas sensor of claim 1, wherein the light emitting surface is in contact with the side of the light cavity portion.

4. The gas sensor of claim 1, wherein the reflective surface is coated with an infrared ray reflective material.

5. The gas sensor of claim 1, wherein the light emitting surface is a curved surface having a first curvature radius, and the reflective surface is a curved surface having a second curvature radius.

6. The gas sensor of claim 5, wherein the second curvature radius of the reflective surface is varied depending on a distance between the reflective surface and the focus point of the light reflected from the reflective surface.

7. The gas sensor of claim 1, wherein the second light coupling portion includes:
   a light incident surface facing a side of the light cavity portion and having a via hole through which light incident from the light cavity portion passes; and
   a reflecting surface extended to the light incident surface to surround an upper portion and a side portion of the light detector, reflecting light incident from the light cavity portion toward the light detector.

8. The gas sensor of claim 7, wherein the via hole of the light incident surface is arranged to correspond to a via hole formed at the side of the light cavity portion.

9. The gas sensor of claim 7, wherein an infrared filter is arranged in the via hole of the light incident surface.

10. The gas sensor of claim 7, wherein the light incident surface is in contact with the side of the light cavity portion.

11. The gas sensor of claim 7, wherein the reflective surface is coated with an infrared reflective material.

12. The gas sensor of claim 7, wherein the light incident surface is a curved surface having a third curvature radius, and the reflective surface is a curved surface having a fourth curvature radius.

13. The gas sensor of claim 1, wherein the light cavity portion has a cylindrical body portion of which upper and lower surfaces are flat surfaces and side is a curved surface, and the light cavity portion includes a first via hole and a second via hole at the side, the first via hole allowing the light emitted from the light source portion to enter the light cavity portion, and the second via hole allowing the light multi-reflected inside the light cavity portion to the light detector.

14. The gas sensor of claim 13, wherein the inside of the side of the light cavity portion is coated with an infrared reflective material.

15. The gas sensor of claim 13, wherein the first via hole is formed to correspond to the first light coupling portion, and the second via hole is formed to correspond to the second light coupling portion.

16. The gas sensor of claim 13, wherein the first via hole has a diameter varied depending on a distance between the reflective surface of the first light coupling portion and a focus point of light reflected from the reflective surface.

17. The gas sensor of claim 13, wherein an infrared filter is arranged in the second via hole.

18. The gas sensor of claim 13, wherein the side of the light cavity portion is a curved surface having a predetermined curvature radius, and the curvature radius is varied depending on a distance between the side of the light cavity portion and a focus point of light reflected from the side of the light cavity portion.

* * * * *